(12) United States Patent
Luk et al.

(10) Patent No.: US 12,393,975 B2
(45) Date of Patent: Aug. 19, 2025

(54) MULTI-HOSTED LIVESTREAM IN AN OPEN WEB ECOMMERCE ENVIRONMENT

(71) Applicant: Loop Now Technologies, Inc., San Mateo, CA (US)

(72) Inventors: Jerry Ting Kwan Luk, Menlo Park, CA (US); Michael A Shoss, Milton (CA)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 18/386,295

(22) Filed: Nov. 2, 2023

(65) Prior Publication Data

US 2024/0152994 A1 May 9, 2024

Related U.S. Application Data

(60) Provisional application No. 63/546,768, filed on Nov. 1, 2023, provisional application No. 63/546,077, filed (Continued)

(51) Int. Cl.
| | |
|---|---|
| *G06Q 30/0601* | (2023.01) |
| *G06Q 30/0207* | (2023.01) |
| *G06Q 30/0235* | (2023.01) |
| *H04N 21/2187* | (2011.01) |
| *H04N 21/431* | (2011.01) |
| *H04N 21/478* | (2011.01) |

(Continued)

(52) U.S. Cl.
CPC ..... *G06Q 30/0643* (2013.01); *G06Q 30/0222* (2013.01); *G06Q 30/0235* (2013.01); *G06Q 30/0239* (2013.01); *G06Q 30/0633* (2013.01); *H04N 21/2187* (2013.01); *H04N 21/4316* (2013.01); *H04N 21/47815* (2013.01); *H04N 21/4394* (2013.01); *H04N 21/44008* (2013.01); *H04N 21/44213* (2013.01)

(58) Field of Classification Search
CPC ................. G06Q 30/0643; H04N 21/4316
See application file for complete search history.

(56) References Cited

U.S. PATENT DOCUMENTS

| | | | |
|---|---|---|---|
| 8,069,414 B2 | 11/2011 | Hartwig et al. | |
| 8,244,707 B2 | 8/2012 | Lin et al. | |
| (Continued) | | | |

FOREIGN PATENT DOCUMENTS

WO  WO-2020238081 A1 * 12/2020 ......... G06K 9/00268

*Primary Examiner* — Vincent M Cao

(74) *Attorney, Agent, or Firm* — Adams Intellex, PLC

(57) ABSTRACT

Techniques for a multi-hosted livestream in an open web ecommerce environment are disclosed. A livestream event that includes a first host and a plurality of viewers is initiated on a website. A product for sale is included in the livestream event that is displayed in a livestream window. A second host is added to the livestream event. The first host and second host appear simultaneously in the livestream event. A product card representing the at least one product for sale is pinned in the livestream window by one of the plurality of hosts. Purchase details of the at least one product for sale are revealed, based on a first action with the product card by a viewer. The revealing is rendered to the viewer. An ecommerce purchase of the product by the viewer is enabled. The ecommerce purchase is accomplished within the livestream window.

25 Claims, 10 Drawing Sheets

Related U.S. Application Data on Oct. 27, 2023, provisional application No. 63/536,245, filed on Sep. 1, 2023, provisional application No. 63/524,900, filed on Jul. 4, 2023, provisional application No. 63/522,205, filed on Jun. 21, 2023, provisional application No. 63/472,552, filed on Jun. 12, 2023, provisional application No. 63/464,207, filed on May 5, 2023, provisional application No. 63/458,733, filed on Apr. 12, 2023, provisional application No. 63/458,458, filed on Apr. 11, 2023, provisional application No. 63/458,178, filed on Apr. 10, 2023, provisional application No. 63/454,976, filed on Mar. 28, 2023, provisional application No. 63/447,918, filed on Feb. 24, 2023, provisional application No. 63/447,925, filed on Feb. 24, 2023, provisional application No. 63/443,063, filed on Feb. 3, 2023, provisional application No. 63/438,011, filed on Jan. 10, 2023, provisional application No. 63/437,397, filed on Jan. 6, 2023, provisional application No. 63/431,757, filed on Dec. 12, 2022, provisional application No. 63/430,372, filed on Dec. 6, 2022, provisional application No. 63/424,958, filed on Nov. 14, 2022, provisional application No. 63/423,128, filed on Nov. 7, 2022.

(51) Int. Cl.
*H04N 21/439* (2011.01)
*H04N 21/44* (2011.01)
*H04N 21/442* (2011.01)

(56) References Cited

U.S. PATENT DOCUMENTS

| | | | |
|---|---|---|---|
| 8,572,490 B2 | 10/2013 | Hartwig et al. | |
| 9,118,712 B2 | 8/2015 | McCoy et al. | |
| 9,152,392 B2 | 10/2015 | Petro et al. | |
| 9,532,116 B2 | 12/2016 | Terpe | |
| 9,608,983 B2 | 3/2017 | Fee | |
| 9,645,700 B2 | 5/2017 | Tsai | |
| 9,693,013 B2 | 6/2017 | Nesamoney et al. | |
| 9,824,372 B1 | 11/2017 | Seth et al. | |
| 10,021,458 B1* | 7/2018 | Taylor | H04N 21/2187 |
| 10,089,402 B1 | 10/2018 | Winkler et al. | |
| 10,440,436 B1* | 10/2019 | Taylor | H04N 21/812 |
| 10,496,350 B2 | 12/2019 | Lazier et al. | |
| 10,955,999 B2 | 3/2021 | Lotinsky et al. | |
| 11,075,891 B1 | 7/2021 | Long et al. | |
| 11,170,814 B1 | 11/2021 | Rajauria et al. | |
| 11,183,217 B1 | 11/2021 | Liu et al. | |
| 11,250,111 B2 | 2/2022 | Goldston et al. | |
| 11,250,399 B2 | 2/2022 | Knock | |
| 11,317,060 B1* | 4/2022 | Libin | H04N 7/157 |
| 2007/0043713 A1 | 2/2007 | Elmi et al. | |
| 2010/0149359 A1 | 6/2010 | Taoka | |
| 2011/0093784 A1* | 4/2011 | Kiraz | G06F 3/04847 |
| | | | 715/719 |
| 2013/0021373 A1 | 1/2013 | Vaught et al. | |
| 2013/0097477 A1 | 4/2013 | Adolf et al. | |
| 2013/0145267 A1 | 6/2013 | Ramachandran | |
| 2013/0215116 A1 | 8/2013 | Siddique et al. | |
| 2013/0276021 A1 | 10/2013 | Cho | |
| 2014/0101537 A1 | 4/2014 | Antkowiak et al. | |
| 2014/0106881 A1 | 4/2014 | Antkowiak et al. | |
| 2014/0229331 A1 | 8/2014 | McIntosh et al. | |
| 2014/0376876 A1 | 12/2014 | Bentley et al. | |
| 2015/0177940 A1 | 6/2015 | Trevino et al. | |
| 2015/0195175 A1 | 7/2015 | Kariman | |
| 2015/0213516 A1 | 7/2015 | Jeremias | |
| 2015/0278348 A1 | 10/2015 | Paruchuri et al. | |
| 2016/0065929 A1 | 3/2016 | Barcons-Palau et al. | |
| 2016/0088369 A1 | 3/2016 | Terpe | |
| 2016/0093105 A1 | 3/2016 | Rimon et al. | |
| 2017/0109584 A1 | 4/2017 | Yao et al. | |
| 2017/0269816 A1 | 9/2017 | Bradley et al. | |
| 2018/0068019 A1 | 3/2018 | Novikoff et al. | |
| 2018/0132011 A1 | 5/2018 | Shichman et al. | |
| 2018/0253765 A1 | 9/2018 | Avedissian et al. | |
| 2018/0288396 A1 | 10/2018 | Bouazizi et al. | |
| 2018/0352303 A1* | 12/2018 | Siddique | H04L 65/1069 |
| 2019/0387267 A1* | 12/2019 | Shusman | H04N 21/2668 |
| 2021/0014559 A1 | 1/2021 | Thapaliya | |
| 2021/0295324 A1 | 9/2021 | Kerseboom et al. | |
| 2021/0326852 A1 | 10/2021 | Yantis et al. | |
| 2021/0358038 A1 | 11/2021 | Vandenberg et al. | |
| 2021/0390531 A1 | 12/2021 | Voorhees et al. | |
| 2021/0398095 A1 | 12/2021 | Mallett et al. | |
| 2021/0406920 A1 | 12/2021 | McLancy | |
| 2022/0053233 A1 | 2/2022 | Baxter et al. | |
| 2022/0122161 A1 | 4/2022 | Perera | |
| 2022/0164864 A1* | 5/2022 | Li | G06Q 30/0281 |
| 2022/0191594 A1* | 6/2022 | Devoy, III | G06Q 30/0641 |
| 2022/0239988 A1* | 7/2022 | Yang | H04N 21/4725 |
| 2022/0345755 A1* | 10/2022 | Pollock | G06V 20/41 |
| 2022/0353473 A1 | 11/2022 | Springer | |
| 2022/0383394 A1* | 12/2022 | Anerella | H04N 21/2187 |
| 2023/0033852 A1* | 2/2023 | Avrunin | H04N 7/155 |
| 2023/0126108 A1 | 4/2023 | Roper | |

\* cited by examiner

MULTI-HOSTED LIVESTREAM IN AN OPEN WEB ECOMMERCE ENVIRONMENT

RELATED APPLICATIONS

This application claims the benefit of U.S. provisional patent applications "Multi-Hosted Livestream In An Open Web Ecommerce Environment" Ser. No. 63/423,128, filed Nov. 7, 2022, "Cluster-Based Dynamic Content With Multi-Dimensional Vectors" Ser. No. 63/424,958, filed Nov. 14, 2022, "Text-Driven AI-Assisted Short-Form Video Creation In An Ecommerce Environment" Ser. No. 63/430,372, filed Dec. 6, 2022, "Temporal Analysis To Determine Short-Form Video Engagement" Ser. No. 63/431,757, filed Dec. 12, 2022, "Connected Television Livestream-To-Mobile Device Handoff In An Ecommerce Environment" Ser. No. 63/437,397, filed Jan. 6, 2023, "Augmented Performance Replacement In A Short-Form Video" Ser. No. 63/438,011, filed Jan. 10, 2023, "Livestream With Synthetic Scene Insertion" Ser. No. 63/443,063, filed Feb. 3, 2023, "Dynamic Synthetic Video Chat Agent Replacement" Ser. No. 63/447,918, filed Feb. 24, 2023, "Synthesized Realistic Metahuman Short-Form Video" Ser. No. 63/447,925, filed Feb. 24, 2023, "Synthesized Responses To Predictive Livestream Questions" Ser. No. 63/454,976, filed Mar. 28, 2023, "Scaling Ecommerce With Short-Form Video" Ser. No. 63/458,178, filed Apr. 10, 2023, "Iterative AI Prompt Optimization For Video Generation" Ser. No. 63/458,458, filed Apr. 11, 2023, "Dynamic Short-Form Video Transversal With Machine Learning In An Ecommerce Environment" Ser. No. 63/458,733, filed Apr. 12, 2023, "Immediate Livestreams In A Short-Form Video Ecommerce Environment" Ser. No. 63/464,207, filed May 5, 2023, "Video Chat Initiation Based On Machine Learning" Ser. No. 63/472,552, filed Jun. 12, 2023, "Expandable Video Loop With Replacement Audio" Ser. No. 63/522,205, filed Jun. 21, 2023, "Text-Driven Video Editing With Machine Learning" Ser. No. 63/524,900, filed Jul. 4, 2023, "Livestream With Large Language Model Assist" Ser. No. 63/536,245, filed Sep. 1, 2023, "Non-Invasive Collaborative Browsing" Ser. No. 63/546,077, filed Oct. 27, 2023, and "AI-Driven Suggestions For Interactions With A User" Ser. No. 63/546,768, filed Nov. 1, 2023.

Each of the foregoing applications is hereby incorporated by reference in its entirety.

FIELD OF ART

This application relates generally to video processing and more particularly to a multi-hosted livestream in an open web ecommerce environment.

BACKGROUND

Computers have enabled the processing of data in a myriad of ways, some of which were not even considered possible only a few years ago. Processing power, and the storage required to maintain huge amounts of data, have grown exponentially over the last 70 years. In order to make this data more useful, high-speed accessibility of the data must be provided. Fast data networks, both public and private, have been developed and deployed to support the transfer of huge amounts of data. Today, instead of purchasing a physical CD or DVD, many people choose to simply download or stream data directly to their own personal device. Video, music, and other types of media files can be streamed instantaneously by encoding and transmitting sequential packets of data. The term "streaming" can refer to any media content, whether live or previously recorded, that is delivered to computers and mobile devices via a network, usually for immediate consumption. The data delivery is based on a communications protocol that enables real-time media playback.

Podcasts, webcasts, movies, TV shows, sporting events, and music videos are common forms of streaming content. Social media platforms and other providers stream celebrity events, political debates, and livestreaming, while other services enable streaming between users. Streaming media can be experienced on a variety of compatible smartphones, tablets, TVs, computers, and gaming consoles when relatively fast broadband is available. One popular form of streaming media is the short-form video. Individuals can consume short-form videos on any connected device from almost anywhere, whether at home, at work, or even walking outside. Social media platforms are an extremely common internet-based video source. These platforms are accessed using a browser or specialized app that can be downloaded from many sources. While these services vary widely in their video capabilities, generally they can display short video clips, repeating video "loops", livestreams, music videos, etc. These videos can last anywhere from a few seconds to several minutes or longer. Short-form videos cover a variety of topics including livestreams and livestream replays. Countless hours are spent online watching an endless supply of videos from friends, family, social media "influencers", gamers, favorite sports teams, or from a plethora of other sources.

Short-form videos can support product promotion strategies which are particularly engaging with audiences who ignore text and banner ads. Marketers are now allocating significant advertising budgets to video ads to gain a competitive advantage. Getting someone to click on a static display ad means impressing them enough with a single appealing image or headline. By contrast, video advertising includes more elements that users may find relevant or engaging. Video advertisements may use a catchy song, a funny opening line, or a relatable situation to get viewers hooked and urge them to watch the advertisement in its entirety. The rise of technologies and services that enable video have led to new levels of engagement. Users now consume a vast amount of video online. Additionally, users can easily comment on, share, and otherwise engage with short-form videos as promotional tools. As technologies improve and new services are enabled, the proliferation of short-form videos will continue.

SUMMARY

Livestream events can be used to present a wide variety of products. The livestream events can introduce, demonstrate, endorse, and review the products, and so on. The livestream events described herein are further able to connect a plurality of viewers with open web ecommerce sites on which the viewers can obtain further information about the products and can purchase the products. Access to the ecommerce sites is enabled concurrently with the livestream event or a replay of the livestream event. The livestream event continues to play on a viewer's device while the viewer is interacting with information presented via a product card. The viewer can switch back and forth between the livestream event and the product card without leaving or losing track of the livestream event.

Techniques for a multi-hosted livestream in an open web ecommerce environment are disclosed. A livestream event that includes a first host and a plurality of viewers is initiated on a website. A product for sale is included in the livestream event that is displayed in a livestream window. A second host is added to the livestream event. The first host and second host appear simultaneously in the livestream event. A product card representing the at least one product for sale is pinned, using one or more processors, in the livestream window by one of the plurality of hosts. Purchase details of the at least one product for sale are revealed, based on a first action with the product card by a viewer. The revealing is rendered to the viewer. An ecommerce purchase of the product by the viewer is enabled. The ecommerce purchase is accomplished within the livestream window.

A computer-implemented method for video processing is disclosed comprising: initiating a livestream event on a website, with a plurality of viewers, wherein the initiating includes a first host; including at least one product for sale in the livestream event with the plurality of viewers wherein the livestream event is displayed in a livestream window; adding a second host to the livestream event, wherein the adding causes the first host and second host to appear simultaneously in the livestream event and wherein the first host and the second host comprise a plurality of hosts; pinning a product card, using one or more processors, in the livestream window by one of the plurality of hosts, wherein the card represents the at least one product for sale; revealing purchase details of the at least one product for sale, based on a first action with the product card by a viewer from the plurality of viewers, wherein the revealing is rendered to the viewer; and enabling an ecommerce purchase of the at least one product for sale by the viewer, wherein the ecommerce purchase is accomplished within the livestream window. In embodiments, the plurality of hosts includes visible hosts and hidden hosts. Some embodiments comprise promoting at least one viewer, from the plurality of viewers, to appear in the livestream event. Some embodiments comprise limiting a combined number of visible hosts and promoted viewers to a predetermined number, wherein one or more visible hosts are demoted to hidden hosts.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
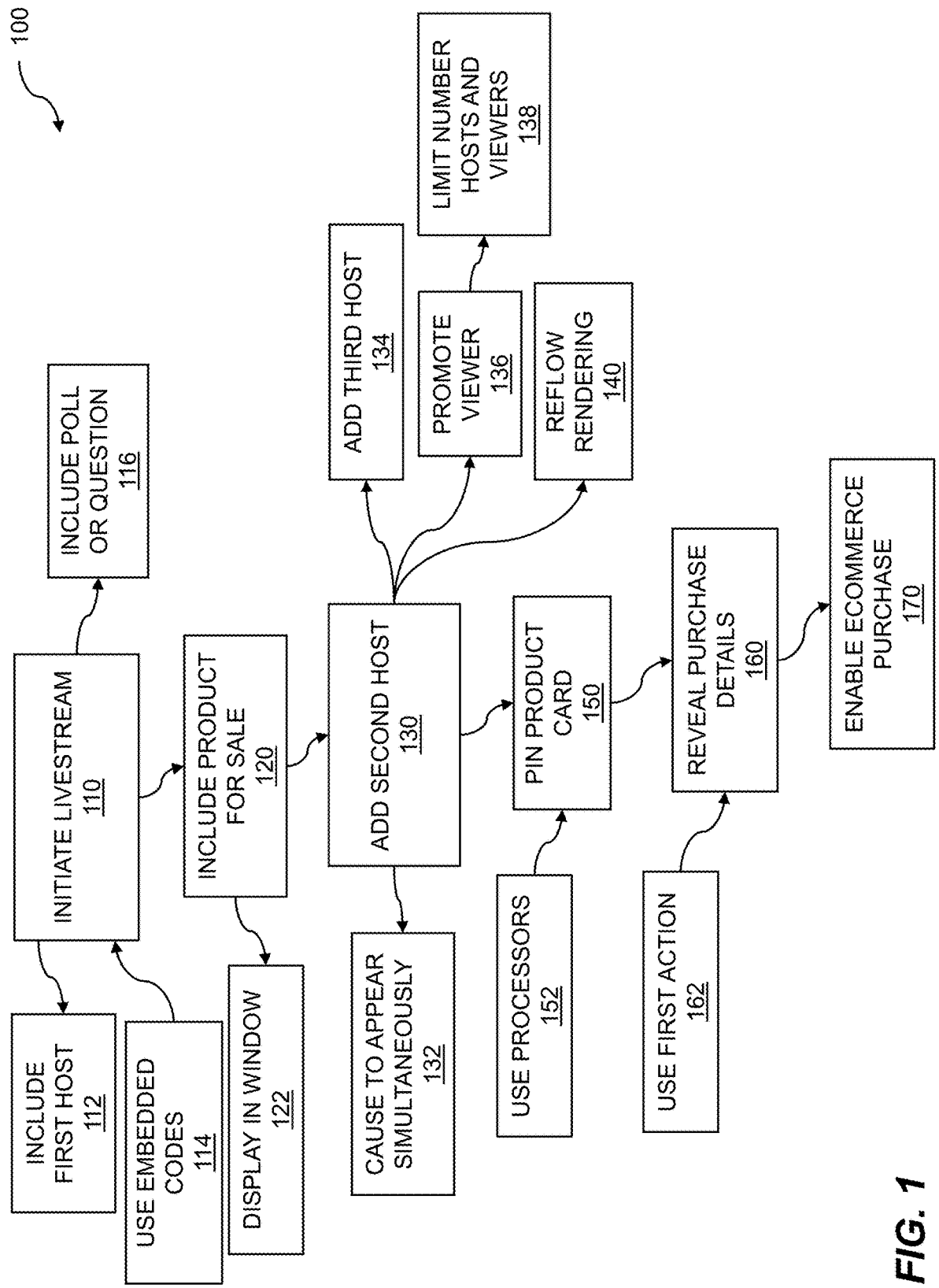
FIG. 1 is a flow diagram for a multi-hosted livestream in an open web ecommerce environment.

Personal electronic devices including mobile devices are used to access many types of information on the Internet. The electronic devices, which can include desktop computers; laptop computers; and personal electronic devices such as tablets, smartphones, and PDAs; are widely used by individuals to observe and interact with online media content. Some of the most popular content provided includes product information. The product information can be presented as a livestream event that is hosted by an individual or a team of individuals. The livestream event includes video streams, audio, text, images, etc., and provides a forum for the individual or team to present thoughts, comments, and reactions to a wide variety of goods and services. The livestream events can be generated using a wide variety of electronic devices such as smartphones, tablet computing devices, televisions, laptop computers, desktop computers, and digital video cameras, among many others. Livestream videos are becoming more and more relevant for the wide dissemination of information and for entertainment. The information can include news and weather information, sports highlights, product information, reviews of products and services, product promotions, educational materials, how-to videos, advertising, etc. In light of these trends, the generation of livestream videos is taking on a significantly more important role in information dissemination, education, advertisement, and entertainment.

Livestream events can be used to present a wide variety of products. The livestream events can introduce, demonstrate, endorse, and review the products, and so on. The livestream events described herein are further able to connect a plurality of viewers with open web ecommerce sites on which the viewers can obtain further information about the products and can purchase the products. Access to the ecommerce sites is enabled concurrently with the livestream event or a replay of the livestream event. The livestream event continues to play on a viewer's device while the viewer is interacting with information presented via a product card. The viewer can switch back and forth between the livestream event and the product card without leaving or losing track of the livestream event.

The livestream event is hosted by at least one host individual. A host individual is a person who may discuss multiple products during the course of a livestream event. The products that are discussed can be offered from a single vendor or from a variety of vendors. The products offered from a variety of vendors may all be related (e.g., automotive products). Some videos may include multiple host individuals operating as a team to discuss one or more products. As a host begins discussing, using, or otherwise interacting with a given product (object) within the livestream event, the product is detected by computer-implemented techniques and a highlight indication is rendered in the manipulated video. The highlight indication can be generated or rendered based on the actions and/or spoken words of the host individual, and/or other criteria. The highlight indication can be a static image such as a graphic illustration which is overlaid on the object, surrounds the object, or is placed adjacent to the object, and/or can additionally include overlaid text, and/or photographs. The highlight indication can be a dynamically changing image such as an animation, video clip, animated GIF, and/or some other dynamically changing image. The highlight indications can be created a priori, or highlight indications can be defined and/or selected to correspond to the product currently being discussed by a host individual. The defining can include the size and/or color of the highlight indication. The highlight indication can be defined and/or selected based on information in an audio track associated with the livestream video. In embodiments, the highlight indication can be defined and/or selected based on machine learning. Supervised and/or unsupervised learning can be used for defining and/or placing highlight indications utilizing artificial intelligence, neural networks, deep learning, and/or other suitable techniques.

Techniques for a multi-hosted livestream in an open web ecommerce environment are disclosed. The hosts of a livestream event can present a variety of products to viewers of the event. The products can include household, automotive, cosmetic, haircare, clothing, electronics, and myriad other products. The hosts can include celebrities, social media influencers, paid promoters, and others who can effectively present the products and encourage their viewers to "convert" (i.e., buy) the products being shown within the livestream event.

A product card can be added to a window in which the livestream event is being rendered. A product card can include detailed information about the product such as size and color options, shipping choices and costs, technical specifications, and other information relevant to the product being shown. The product card can appear as a highlighted representation of the product. The product card pinning can be performed by one or more of the hosts associated with the livestream event. The product card pinning can also be performed automatically using computer-implemented techniques. The computer-implemented techniques can be based on determining gaze direction of one or more of the hosts toward the product within the livestream, on natural language processing techniques to determine that a host is talking about the product, and so on. When a viewer of the livestream interacts with the product card, disclosed embodiments present additional product information and/or a user interface that enables purchase of the product via a virtual purchase cart. By pinning the product card to the livestream event, objects within the livestream can be emphasized, making the livestream event more engaging and interesting to viewers. The objective of the livestream event becomes clearer to the viewer, and the ecommerce orientation becomes clearer and more impactful.

Further embodiments include alerting the plurality of hosts to pin the product card associated with the at least one product for sale. The alerting can occur when one of the plurality of hosts is identified to be highlighting the at least one product for sale. The identifying that one of the hosts is highlighting a product can be accomplished using a variety of techniques. The identifying can be based on machine learning, where the machine learning can determine that a product for sale is being handled by one or more of the hosts. The identifying can also be based on speech analysis. Speech analysis, such as natural language processing, can be used to determine when one or more of the hosts are talking about the product. The hosts may or may not be handling the product while they are talking about the product. The identifying can further be based on gaze detection of one of the plurality of hosts. The hosts can be looking at or in the direction of the product for sale. The gaze detection can be used to alert the plurality of hosts to pin the product card so that the livestream event users can learn more about the product and purchase the product. The identification of products within a video can be based on pattern recognition, optical identifiers, etc. The optical identifiers can include information on product labels. The information can include barcodes, text, images, and/or other optical patterns imprinted or rendered on the product. In embodiments, the identification of products is performed automatically, and a product tag, which can include a highlight indication, is generated and rendered on the video. The highlight indication can track the motion of the associated product or object as it is moved within the video. In some embodiments, multiple highlight indications can be simultaneously rendered in a video. This can occur, for example, when multiple products are being featured, compared, or otherwise discussed concurrently.

The highlighting associated with a product card can be presented in various forms. In some embodiments, the product card highlighting can include drawing a closed shape, such as a rectangle or oval, around an object. The product card highlighting can include applying a translucent mask over the video, where the portion of the mask over and/or adjacent to the object is lighter than the rest of the mask, creating a "spotlight" effect. The product card highlighting can include rendering a graphic element such as an icon. In some embodiments, the icon can include an arrow pointing to the object. Further, text can be included in addition to, or instead of, the icon. The text can include instructions for a viewer of the video, which prompt them to interact with the highlighted object. In embodiments, the viewer of the livestream event interacts with the product card object by selecting the object. The selecting can include placing a mouse cursor over the object and clicking on the object. In some embodiments, the selecting can include mousing over the object (placing the cursor over the object without any mouse clicking). Further, some embodiments utilize a touchscreen, and the selecting can include tapping, double tapping, and/or swiping the object with a finger of the viewer, stylus, or using some other suitable technique. In some embodiments, the selecting can include eye gaze of the viewer of the video directed at the highlighted object for a predetermined duration. The selecting can be based on voice recognition. In some embodiments, once an object is highlighted, a user can utter a phrase, such as "show me more" to perform an interaction with the highlighted object.

The identification of a product or object for which a product card can be pinned can be based on user input. As an example, a host individual within a livestream video event can be discussing a kitchen appliance such as a blender. A viewer of the livestream can take note of an additional item or object such as the shirt or blouse that the host individual is wearing. The viewer of the livestream can be interested in learning more about the shirt that the host individual is wearing, even though the main topic of the video is a blender and not the shirt that the host individual is wearing. In embodiments, the user can select (e.g., using a mouse cursor, fingers on a touchscreen, or the like) a region of the video that includes the shirt of the host individual. This selection action causes disclosed embodiments to perform an object analysis within that region. A shirt can be identified within that region. The shirt can be compared to an existing database of shirts, and if identified, a product card that includes product information associated with the shirt can be presented to the viewer of the livestream. While a shirt is used in the aforementioned example, disclosed embodiments can perform similar actions with many other objects that can be identified utilizing computer-implemented techniques. Other objects can include glasses; accessories such as necklaces, earrings, or watches; hats or hair coverings; etc.

FIG. 1 is a flow diagram 100 for a multi-hosted livestream in an open web ecommerce environment. The flow 100 includes initiating 110 a livestream event, on a website, with a plurality of viewers. A livestream event can be initiated by accessing a video source and an audio source that are accessible to a computing device. The video source can include a video camera, a webcam, a handheld device such as a tablet or smartphone, and so on. The audio source can include a separate audio pickup device such as a USB microphone, a microphone built into a computer or handheld device, etc. The video and the audio can be encoded using an encoder that is suitable for livestreaming. The encoding can be accomplished using a hardware encoder, a software encoder, a combination of hardware and software, etc. The livestream can be initiated through a livestream platform. The livestream platform can include a commercial platform, a social media platform, and the like. The plurality of viewers can view the livestream event by pointing a web browser to a uniform resource locator address (URL), by opening an app loaded on an electronic device that supports livestream events, etc.

In the flow 100, the initiating includes a first host 112. The first host can include an expert who is familiar with a range of products and services, a professional marketer, a hired presenter, a celebrity, a social media influencer, and so on. In embodiments, the livestream event can be a livestream replay. A livestream replay can include replaying a livestream that was previously recorded. In the flow 100, the initiating is accomplished with embedded codes 114. The embedded codes can begin replaying a livestream event such as a previously recorded livestream. In a usage example, a user navigates to a livestream website. One or more livestreams can be available to the viewer, where some of the livestreams may currently be live, while other streams were previously recorded. The viewer can click on a livestream to join a livestream or replay a livestream. The clicking on the livestream can execute the embedded code which can join a livestream or initiate a replay. In the flow 100, the initiating further includes at least one poll or question 116. The poll can be used to gauge viewer experience, interest, preferences, and so on. A question can include a "yes or no" question, a short answer, etc.

The flow 100 comprises including at least one product for sale 120 in the livestream event with the plurality of viewers. The products can include a wide variety of items such as household items, automotive parts and accessories, cosmetic items, haircare products, clothing items, electronic devices, and myriad other products. In embodiments, at least one product for sale can be a service or event. Depending on the type of product, the host can handle the product, demonstrate the product, etc. In embodiments, the livestream event is rendered on the website or an application running on a device. In the flow 100, the livestream event is displayed 122 in a livestream window. The livestream window can be rendered on a screen associated with a computing device, a handheld device, a television, a projector, and so on. The livestream window can include a window associated with a web browser, a window associated with a video playing or video stream application or app, and the like. In other embodiments, the livestream event can be rendered in a playlist. The playlist can include a playlist of previously recorded livestreams, livestreams currently available, a schedule of future livestreams, etc.

The flow 100 includes adding a second host 130 to the livestream event. The second host can include a second expert or paid professional, a marketer, a paid endorser, a celebrity, etc. The second host may be added to promote products that can be unfamiliar to the first host. In embodiments, the second host can be added to the livestream by a web link. The first host can click the web link to add the second host. In other embodiments, the second host can be added to the livestream by an application running on a device. In a usage example, the second host can "call in" at an appointed time in the livestream event to join the event. The calling in can connect the second host to the livestream. In the flow 100, the adding causes the first host and the second host to appear simultaneously 132 in the livestream event, wherein the first host and the second host comprise a plurality of hosts. The first host and the second host can be arranged horizontally in the livestream, vertically, and so on. The first host and the second host can both be seen and heard simultaneously without any intervention required on the part of a viewer. The flow 100 further includes adding a third host 134 to the livestream event and including the third host in the plurality of hosts. The third host can support the first host and the second host, provide additional information and expertise to the livestream event, and the like. The three hosts can appear simultaneously within the livestream. Additional hosts can be added to the plurality of hosts. In embodiments, the plurality of hosts includes visible hosts and hidden hosts. The visible hosts can be seen within the livestream while the hidden hosts can remain hidden from the livestream. The visible hosts and the hidden hosts can be swapped throughout the livestream event. A hidden host can be promoted to a visible host, and a visible host can be "demoted" to a hidden host.

The flow 100 further includes promoting at least one viewer 136, from the plurality of viewers, to appear in the livestream event. A viewer can be promoted to appear in the livestream event based on various criteria. In embodiments, the promoting the at least one viewer can be accomplished by one of the visible hosts. The viewer can be particularly engaged with the livestream event by liking the livestream event or products featured in the livestream, sharing links, commenting, asking questions in a chat window, and so on. The host can choose to promote the viewer so that the viewer can share their enthusiasm for the product, ask a question about the product, etc. In embodiments, the promoting can be in response to a request of the at least one viewer during the livestream. The number of hosts and promoted viewers can be limited by the window space available within the livestream event. The flow 100 further includes limiting a combined number of visible hosts and promoted viewers 138 to a predetermined number, wherein one or more visible hosts are demoted to hidden hosts. The promoting viewers and demoting hosts can occur throughout the livestream event. A host can be switched between visible and hidden as required to support the livestream event. Similarly, viewers can be promoted and demoted as often as the one or more hosts choose to do so. A combination of up to 16 hidden hosts and promoted viewers can be stored in a queue when the number of visible hosts and promoted viewers exceeds the predetermined number. In other cases, the combination can be of 32, or some other number of, hidden hosts and promoted viewers in a queue. The flow 100 further includes reflowing 140 a rendering of the livestream event based on a number of hosts and viewers appearing in the livestream event. The reflowing can recalculate the positions of hosts, viewers, products for sale, etc. so that the rendering of the livestream event can continue to stream after changes to the livestream are made.

The flow 100 includes pinning 150 a product card in the livestream window by one of the plurality of hosts. The product card that is pinned represents the at least one product for sale. In embodiments, the hidden hosts can be prevented from the pinning a product card. The pinning the product card by visible hosts makes clear to the viewers who is doing the pinning. Embodiments can include inserting a representation of the first object into the on-screen product card. A product card is a graphical element such as an icon, thumbnail picture, thumbnail video, symbol, or other suitable element that is displayed in front of the video. The product card is selectable via a user interface action such as a press, swipe, gesture, mouse click, verbal utterance, or other suitable user action. When the product card is invoked, an additional on-screen display is rendered over a portion of the video while the video continues to play. This rendering enables a user to purchase a product/service while preserving a continuous video playback session. In other words, the user is not redirected to another site or portal that causes the video playback to stop. Thus, users are able to initiate and complete a purchase completely inside of the video playback user interface, without being redirected away from the currently playing video. Allowing the video to play during the purchase can enable improved audience engagement, which can lead to additional sales and revenue, one of the key benefits of disclosed embodiments. In some embodiments, the additional on-screen display that is rendered upon selection or invocation of a product card conforms to an Interactive Advertising Bureau (IAB) format. A variety of sizes are included in IAB formats, such as for a smartphone banner, mobile phone interstitial, and the like. In the flow 100, the pinning is accomplished using one or more processors 152. The processors can be associated with a computing device such as a desktop or laptop computer. The processors can be associated with a server on which the livestream event is hosted.

The flow 100 includes revealing purchase details 160 of the at least one product for sale. In embodiments, the viewer, to whom the purchase details are revealed, can be from the plurality of viewers. The purchase details can include size, color, and quantity available for the product for sale. The purchase details can include shipping options and costs, shipping dates, return policies, etc. The purchase details can include purchase method options. The purchase details can include product vendor details. In the flow 100, the revealing is based on a first action 162 with the product card by a viewer, wherein the revealing is rendered to the viewer. The first action can include clicking, tapping, moving a cursor over, or otherwise performing an action with the product card. The viewer action with the product card can include selecting a size, color, quantity, or other option associated with the product. The action can cause the product associated with the product card to be added to a virtual purchase cart.

The flow 100 includes enabling an ecommerce purchase 170 of the at least one product for sale by the viewer, wherein the ecommerce purchase is accomplished within the livestream window. The enabling can include rendering a product card associated with the product. The enabling can include revealing a virtual purchase cart that supports checkout, including specifying various payment methods, and application of coupons and/or promotional codes. In some embodiments, the payment methods can include fiat currencies such as United States dollar (USD), as well as virtual currencies, including cryptocurrencies such as Bitcoin. In some embodiments, more than one object (product) can be highlighted and enabled for ecommerce purchase. In embodiments, when multiple items are purchased via product cards during the playback of a short-form video, the purchases are cached until termination of the video, at which point the orders are processed as a batch. The termination of the video can include the user stopping playback, the user exiting the video window, the livestream ending, or a prerecorded video ending. The batch order process can enable a more efficient use of computer resources, such as network bandwidth, by processing the orders together as a batch instead of processing each order individually.

Embodiments can include training a machine learning model to recognize products featured in the livestream event. In embodiments, the training includes images from past objects, product catalogs, short-form videos, keywords, or transfer learning. In embodiments, the training includes boosting or reducing the weighting of images, wherein the boosting or reducing is based on the catalog of products. In embodiments, the training includes product categories that appear in the short-form video. Embodiments can include finding a second object from the plurality of objects. In embodiments, the highlighting includes the second object in the short-form video. Embodiments can include rendering one or more products for sale related to the second object, wherein the rendering is enabled by a second user action. In some embodiments, the rendering one or more products for sale is based on a bid from an advertiser. Embodiments can include providing a bid suggestion to the advertiser based on effective cost per thousand (eCPM) impressions. In embodiments, the rendering one or more products for sale is listed in order of highest bid to lower bids as an overlay on the short-form video. The enabling includes an ability for a user to clip coupons.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
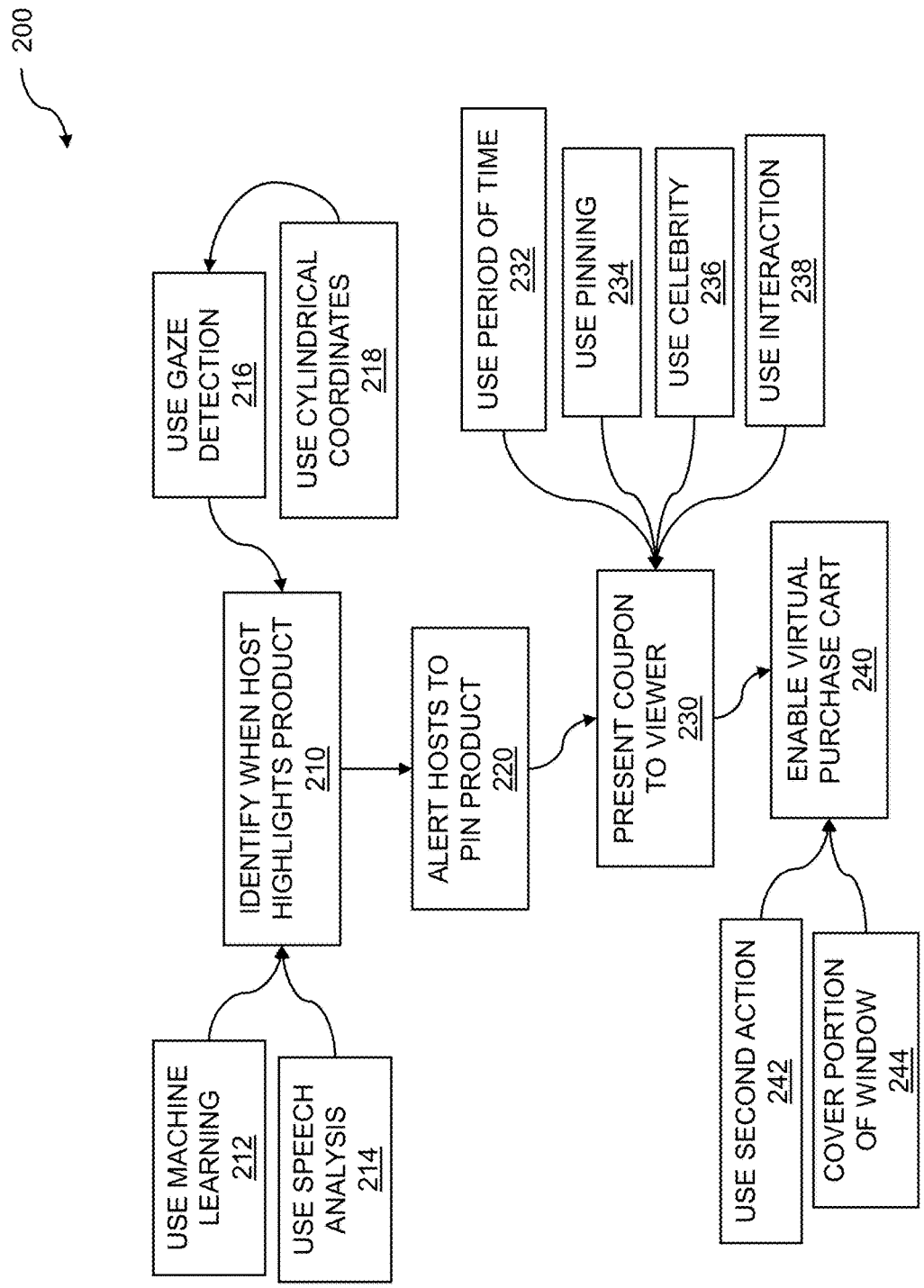
FIG. 2 is a flow diagram for recognizing and purchasing products in a multi-hosted livestream.

FIG. 2 is a flow diagram 200 for recognizing and purchasing products in a multi-hosted livestream. A livestream event is hosted by a plurality of hosts, where the plurality of hosts includes visible hosts and hidden hosts. The livestream event is viewed by a plurality of viewers. The viewers can view and engage with the livestream hosts as the hosts discuss products for sale. The hosts demonstrate, endorse, recommend, and otherwise interact with the product for sale. As the hosts interact with and present the products for sale, a product card is included in the livestream. A viewer can interact with the product card in order to learn more about the product with which the product card is associated. The viewer can purchase the product through an open web ecommerce site. While the viewer is interacting with the product card, the livestream event continues to play. Recognizing and purchasing products enable a multi-hosted livestream in an open web ecommerce environment. A livestream event is initiated, on a website, with a plurality of viewers, wherein the initiating includes a first host. At least one product for sale is included in the livestream event with the plurality of viewers, wherein the livestream event is displayed in a livestream window. A second host is added to the livestream event, wherein the adding causes the first host and second host to appear simultaneously in the livestream event and wherein the first host and the second host comprise a plurality of hosts. A product card is pinned, using one or more processors, in the livestream window by one of the plurality of hosts, representing the at least one product for sale. Purchase details of the at least one product for sale are revealed, based on a first action with the product card by a viewer, wherein the revealing is rendered to the viewer. An ecommerce purchase of the at least one product for sale is enabled to the viewer, wherein the ecommerce purchase is accomplished within the livestream window.

The flow 200 includes identifying when one of the plurality of hosts highlights 210 the at least one product for sale. One or more of the hosts can be presenting a product for sale. The presentation can include handling, talking about, gazing in the direction of the product, and so on.

Various techniques can be used to identify a host highlighting the product for sale. In the flow 200, the identifying is based on machine learning 212. Machine learning can be used to identify objects within the livestream event. Machine learning can be based on training a network such as a neural network for machine learning to identify the objects. The training is accomplished by applying training data and expected inferences to the network, and comparing inferences generated by the network to the expected inferences. Weights within the network are adjusted so that the generated inferences are sufficiently close to the expected inferences.

In the flow 200, the identifying is based on speech analysis 214. Speech analysis techniques, such as techniques based on natural language processing techniques, can be used to analyze audio obtained from the one or more hosts within the livestream event. The natural language processing can detect keywords and phrases that can be associated with the product for sale. In the flow 200, the identifying is based on gaze detection 216 for one of the plurality of hosts. Gaze detection can be used to determine whether one or more of the hosts are gazing in the direction of the product for sale. A coordinate system can be used to describe the gaze detection problem. In embodiments, the gaze detection is accomplished using a cylindrical coordinate system 218. The cylindrical coordinate system can include a distance or radius, an angle, and a height. The gaze detection can determine whether a host is gazing at the product. In embodiments, the gaze detection includes an angle of the first host's face or the second host's face relative to the at least one product for sale. The machine learning can be based on a model. The machine learning model can include, but is not limited to, a binary classification model, multiclass classification model, and/or regression model. The training can include supervised learning, unsupervised learning, semi-supervised learning, and/or reinforcement learning.

The flow 200 further includes alerting the plurality of hosts to pin 220 the product card associated with the at least one product for sale. The alerting can be accomplished using a variety of techniques. The alerting can include texting or emailing the hosts, providing a signal from the director of the livestream event. The alerting can be provided to the hosts using a screen that can be visible to the hosts. The alerting the hosts encourages the hosts to pin the product card associated with the product for sale to the livestream event. The flow 200 further includes presenting a first coupon overlay to the viewer 230, wherein the presenting is rendered to the viewer. The first coupon overlay can include various types of coupons. The first coupon can include a discount that can be applied when purchasing the product, a time-limited discount, free or reduced shipping charges, a promotional product received if the product being presented is purchased, a "buy-one-get-one" (i.e., BOGO) coupon, and the like.

The flow can include finding a second object. In embodiments, the finding of the second object can be performed via machine learning, image classifiers, neural networks, and/or other artificial intelligence techniques for object identification within a video. The flow can include highlighting the second object. In embodiments, object highlighting can include drawing a closed shape such as a rectangle or oval around an object. In some embodiments, the object highlighting can include applying a translucent mask over the video, where the portion of the mask over and/or adjacent to the object is lighter than the rest of the mask, creating a "spotlight" effect. In some embodiments, the highlighting of the second object can occur sequentially. That is, a first object is highlighted, and then a second object is highlighted while the first object becomes unhighlighted. As an example, this can occur during an ecommerce livestream event when a host individual stops discussing/presenting a first object (product) and begins to discuss a second object (product). In some embodiments, the second object can be highlighted concurrently with the first object. As an example, this can occur during an ecommerce short-form video when a host individual discusses two objects (products) concurrently for demonstration, compares the two products, or promotes a collection of products. In some embodiments, the highlighting of the first object and highlighting of the second object can be similar. In other embodiments, the highlighting of the first object can have differences from the highlighting of the second object. For example, the first object can be highlighted in a first color (e.g., green), and the second object can be highlighted in a second color (e.g., orange). In further embodiments, the first object can be highlighted in a first shape (e.g., rectangle), and the second object can be highlighted in a second shape (e.g., oval).

In embodiments, the presenting can include a second coupon overlay rendered to a second viewer, wherein the first coupon overlay and second coupon overlay are different. Further coupons can be presented to other viewers of the livestream event. The other viewers can be presented with the first coupon, the second coupon, or one or more additional coupons. The first coupon and the second coupon can include a quick response (QR) code, barcode, alphanumeric code, or other suitable indicia. In this way, product demonstrations and/or promotions within livestreams, livestream replays, and/or other short-form videos are enhanced. In embodiments, the coupon can be a dynamically decrementing coupon. The dynamically decrementing coupon is presented at a temporal point within an ecommerce video at a predetermined initial value. The initial value is then decremented per given duration of play of the ecommerce short-form video. As an example, at a time of 2:00 (two minutes) within an ecommerce short-form video, a coupon for a ten percent discount on a product is rendered. Every thirty seconds, the coupon value is decremented. Thus, continuing with the example, at a time of 2:30 (two minutes and thirty seconds within the ecommerce short-form video), the coupon value is decremented from ten percent to nine percent (or some other lower value). Then at 3:00, the coupon value is decremented again from nine percent to eight percent. In some embodiments, the decrementing can be linear. In other embodiments, the decrementing can be nonlinear. The dynamically decrementing coupon can be used to encourage viewers to make a purchase earlier within the ecommerce short-form video in order to take advantage of the larger coupon discount.

In the flow 200, the presenting is based on the viewer watching the livestream for a period of time 232. The presenting can be based on a viewer observing a product card associated with product for sale without converting. In a usage example, a viewer is observing the product card for a kitchen appliance such as a water boiler. The viewer may be unable to decide whether to buy the boiler. A coupon can be presented with a discount such as a 10 percent discount. The amount of the discount can be enough to persuade the viewer to convert and to purchase the boiler. In the flow 200, the presenting is based on the pinning 234 of the product card. The presenting the coupon can be accomplished at substantially the same time that the host pins the product card. The host can make a statement about the coupon such as, "Buy now and save 10 percent!" In the flow 200, the presenting is based on the first host or the second host being a celebrity 236. The celebrity can include a movie or TV star, a social media star, and so on. The celebrity can make a statement about the coupon in the livestream event. The product for sale can be specially labeled with information about the celebrity such as celebrity name, logo, or representation. In the flow 200 the presenting is based on analyzing the viewer's interaction 238 with the livestream. The viewer interaction with the livestream can include liking the product, subscribing to the livestreams, sharing the product with social media contacts, asking questions, responding to polls, etc.

Discussed previously and throughout, an ecommerce purchase by the viewer of the at least one product for sale can be enabled. The ecommerce purchase can be accomplished within the livestream window. In the flow 200, the enabling includes a virtual purchase cart 240, wherein the virtual purchase cart is rendered to the viewer. The virtual purchase cart can appear as an icon, a pictogram, a representation of a purchase cart, and so on. The virtual purchase cart can appear as a cart, a basket, a bag, a tote, a sack, and the like. In the flow 200, the livestream event displays the virtual purchase cart to the viewer during the livestream based on a second action 242 by the viewer. The viewer can click on the product or on the virtual purchase cart to add the product to the purchase cart. The viewer can click again on the virtual purchase cart to open the cart to display cart contents. The viewer can save the cart, edit the contents of the cart, delete items in the cart, etc. In the flow 200, the virtual purchase cart rendered to the viewer covers 244 a portion of the livestream window. The portion of the livestream window can range from a small portion to substantially all of the livestream window. However much of the livestream window is covered by the virtual purchase cart, the livestream event continues to play while the viewer is interacting with the virtual purchase cart.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
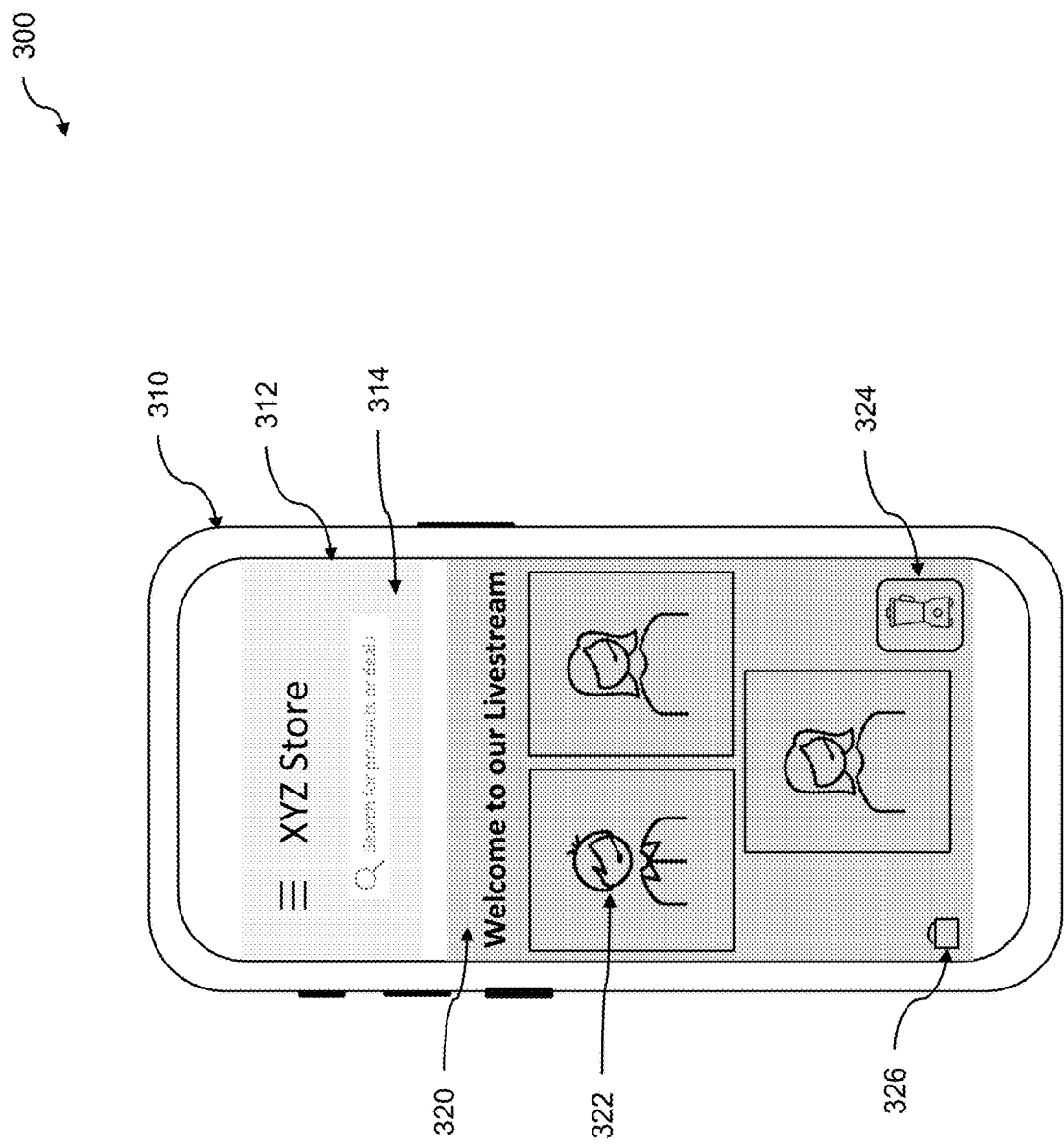
FIG. 3 is an infographic for a multi-hosted livestream in an open web ecommerce environment.

FIG. 3 is an infographic for a multi-hosted livestream in an open web ecommerce environment 300. The multi-hosted livestream can be viewed on an electronic computing device 310. The electronic computing device can include an electronic display 312. The computing device can include a personal electronic device such as a smartphone, PDA, or tablet; a portable device such as a laptop computer; a desktop computer; and so on. The electronic display can support an app such as a web browser, a video player, a video streaming app, and so on. The app can render a variety of content types such as webpages, images, text, and a video stream delivered from a server. The app can render an open web ecommerce site 314 on the display. The electronic display can also include a touchscreen to provide a user interface that enables user interaction. The application, such as an HTML, browser or other special purpose application, executes on the electronic computing device. A livestream event 320 can be rendered on the display. The livestream video can include one or more host individuals 322 who may discuss one or more products during the course of the livestream event. In embodiments, the livestream event comprises a livestream video or livestream video replay. Three host individuals are shown in the example 300, but other embodiments may utilize more or fewer host individuals. More hosts than can be displayed can be associated with the livestream event. In embodiments, the plurality of hosts can include visible hosts and hidden hosts. One or more of the hidden hosts can be promoted to become visible hosts, and one or more of the visible hosts can be demoted or reassigned as hidden hosts. A plurality of viewers can observe the livestream event. Further embodiments include promoting at least one viewer, from the plurality of viewers, to appear in the livestream event. The viewer can be promoted to endorse a product, provide a review, ask a question, and so on. The promoted viewer can be demoted or reassigned back to viewer status.

In the example 300, a product 324 can being discussed by the plurality of hosts 322. In this example, the product 324 is a blender. The hosts can interact with the product by handling, talking about, or gazing in the direction of the blender. The hosts interacting with the product can cause the product to be highlighted. A highlight indication of the product is rendered, based on techniques such as gaze detection; natural language processing; a host individual holding, touching, and/or moving the product; and/or other aforementioned techniques. In embodiments, the highlight indication can be a boundary overlay that surrounds an object, such as illustrated in the infographic, where a boundary or other highlight indication surrounds product 324. A user can select the highlighted indication by a tap, click, mouse-over, gesture, verbal utterance, eye gaze, or other suitable technique. The viewer can decide to purchase the product. The purchase can include tapping the virtual purchase cart to add the product to the virtual purchase cart 326. The virtual purchase cart can be rendered to the viewer as an icon, a pictogram, etc. that can represent the virtual purchase cart. Tapping the virtual purchase cart can expand the cart so that the viewer can see the contents of the virtual purchase cart.

Figure 4:
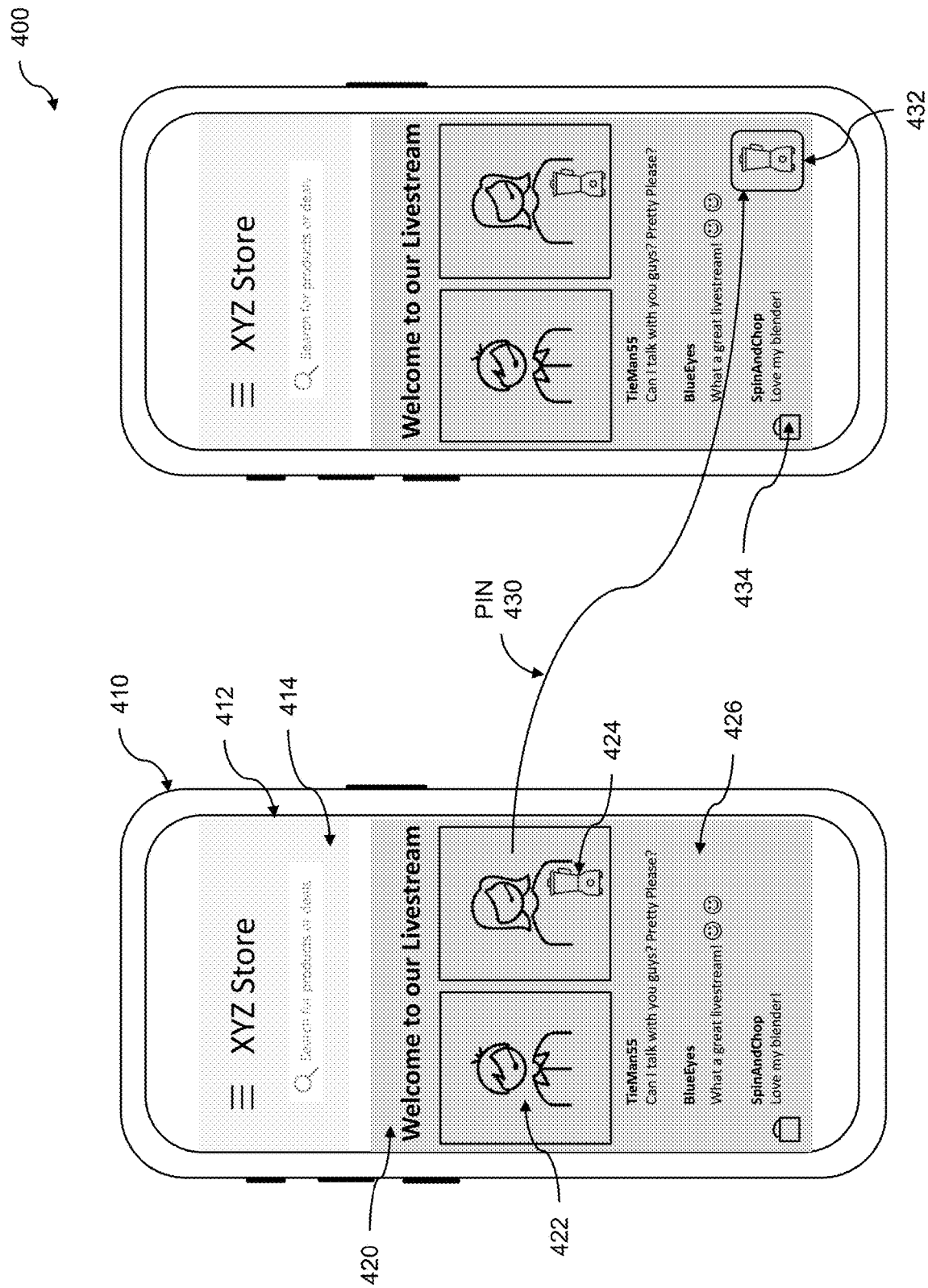
FIG. 4 is an infographic for pinning a product card.

FIG. 4 is an infographic for pinning a product card 400. During a livestream event, hosts of the event can present, refer to, endorse, interact with, etc., one or more products. In order for viewers to the livestream event to learn more about a product and ideally to purchase the product, one or more of the hosts can pin a product card associated with the product into the livestream. The product card can provide key information associated with the product, such as uses and applications for the product, sizes and color choices, shipping charges, number of available products remaining, and so on. The product cards enable the viewer to get excited about the product and encourage the viewer to "convert". A viewer who converts completes a purchase of the product. One or more processors are used to pin the product card in the livestream window. The pinning is performed by one of the plurality of hosts of the livestream event. The product card represents the at least one product for sale in the livestream event. Pinning a product card supports a multi-hosted livestream in an open web ecommerce environment. A viewer can view a livestream event using an electronic device 410. The electronic device can include any of various electronic devices such as a computer, a portable device, a handheld device, and the like. The viewer can observe the livestream event within a video player window 412. The video player window can be associated a web browser, a video streaming app, and so on. An ecommerce site 414 can be rendered within the player window. The ecommerce site rendering can include a web ecommerce site name, radio buttons, a menu such as a pull-down menu presenting various options, a search function, etc. One or more products can be presented, offered, discussed, endorsed, etc. within the livestream event.

A livestream event 420 can be rendered within the video player window. The livestream event can continue to play while the viewer interacts with the ecommerce site. The livestream can include one or more hosts, a combination of one or more hosts and one or more viewers, etc. Two hosts are shown 422 in the infographic. The one or more hosts of the livestream event can interact with a product 424. The product can include a household product, clothing, cosmetics, haircare products, kitchen appliances, and so on. A rendering of the livestream event can further include viewer online names, comments, reactions, questions, and so on. The viewer names and associated text can be obtained from a social media feed 426 and other sources. The social media feed can be associated with the livestream event. The social media feeds can be observed by the one or more hosts during the livestream event. The names, questions, reactions, and comments provided by the viewers of the livestream event can be displayed in the livestream event rendering.

One of the plurality of hosts can pin 430 a product shown within the livestream. The pinning can include pinning a product card 432 within the livestream. A product card can include a text file, a PDF, a webpage, and so on that can provide detailed information about the product associated with the product card. The product card can be rendered as a representation of the product. The representation can include a product photo, a highlighted product image, a product representation, etc. The viewer can select the product card to learn more about the product shown with one or more of the hosts of the livestream event. Selecting the product card can include a mouse click, a trackpad or touchscreen tap, moving a cursor over the product card, or other selection techniques. The livestream can further include a representation of a virtual purchase cart 434. Clicking on the representation of the virtual purchase cart can add the product 432 to the cart, can open the cart to see cart contents such as one or more products, etc.

Figure 5:
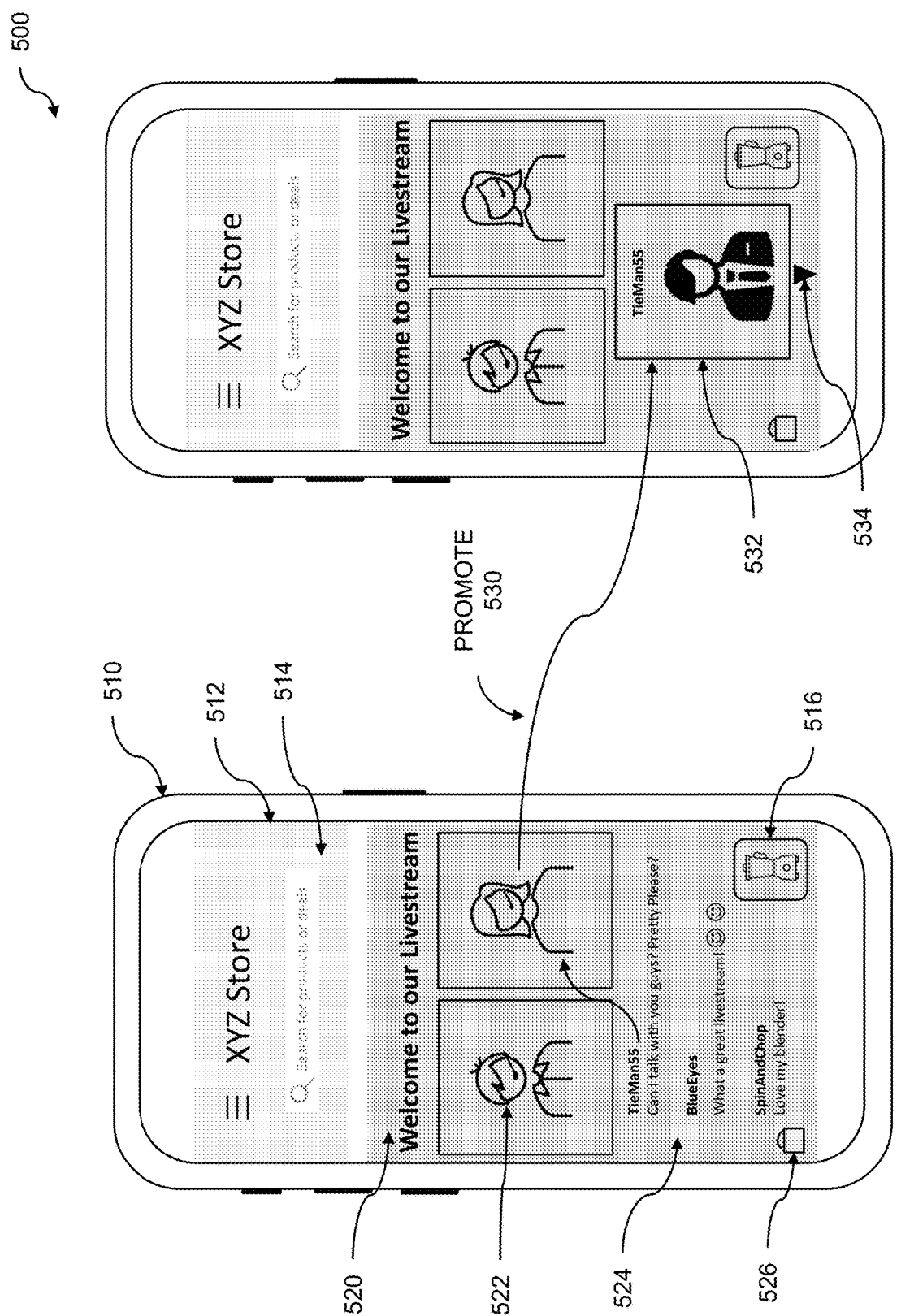
FIG. 5 is an infographic for promoting a viewer in a multi-hosted livestream.

FIG. 5 is an infographic for promoting a viewer in a multi-hosted livestream. A livestream event can be hosted by multiple hosts and can be viewed by a plurality of viewers. The multiple hosts can talk about products for sale through an ecommerce site. The hosts can discuss options, endorse products, describe product uses, and so on. Viewers of the livestream can react to the livestream by posting comments, sharing ideas, asking questions, and the like. A host can choose to promote a viewer to the livestream. The viewer can be promoted to ask a question, share their enthusiasm for the product, etc. The promoted viewer can appear in the livestream, can say what they have been promoted to say, then can be returned to viewer status. The promoting a viewer supports a multi-hosted livestream in an open web ecommerce environment. The viewer can view the multi-hosted livestream using an electronic device. In the infographic 500, an electronic device 510 can include any of a variety of personal electronic devices such as computers, portable and handheld devices, and so on. The multi-hosted livestream can be provided to the viewer within a video player window 512. The video player window can be associated with a web browser window, a video streaming app, etc. An ecommerce site 514 can be rendered within the player window. The rendering of the ecommerce site can include an ecommerce site name, menu options, a search function, and so on. A product 516 can be offered within the livestream event. The product can be rendered within the video player window as a product photo, a highlighted image, a representation, and the like.

The livestream event 520 is rendered within the video player window. The multi-hosted livestream can partially obscure the ecommerce site by appearing over a portion of the ecommerce site. The livestream can include a single host, a plurality of hosts, a combination of one or more hosts and one or more viewers, and the like. The number of people shown within the livestream event can be limited to a maximum number such as up to three hosts, two hosts and a viewer, and other combinations of hosts and viewers. Since the total number of hosts who participate in the livestream event may not be shown at a given time, in embodiments, the plurality of hosts can include visible hosts and hidden hosts. In the infographic 500, two hosts are shown 522. The livestream event can further include viewer names, questions, comments, reactions, etc. The viewer names and associated text can be extracted from various sources including social media 524, where the social media can be associated with the livestream event. The social media feeds can be observed by the one or more hosts, viewers, and others during the livestream event. The questions and comments provided by the viewers can be displayed in the livestream event rendering. Discussed below, a visible host can select a viewer for promotion to the livestream event. The livestream can further include a representation of a virtual purchase cart 526. Clicking on the virtual purchase cart can add a product 516 to the cart, open the cart to see cart contents, etc.

In the infographic, a viewer, "TieMan55" requests to speak to the hosts. One of the hosts can promote 530 the viewer to the livestream event. Promotion of the viewer adds the viewer to the livestream 532. The promoted viewer can be visible to and can speak to the hosts. The promoted viewer can also be visible to the other viewers of the livestream event. The promoted viewer can be hidden in the livestream viewed by an individual viewer by clicking a button 534 such as a dismiss, close, or hide button. An individual viewer hiding the promoted viewer enables the individual viewer to continue to engage with the livestream, interact with the ecommerce site, and so on. An individual viewer hiding the promoted viewer does not impact other viewers seeing the promoted viewer. When one or more of the hosts have finished interacting with the promoted viewer, the promoted viewer can be "demoted", returned to normal viewer status, etc.

Figure 6:
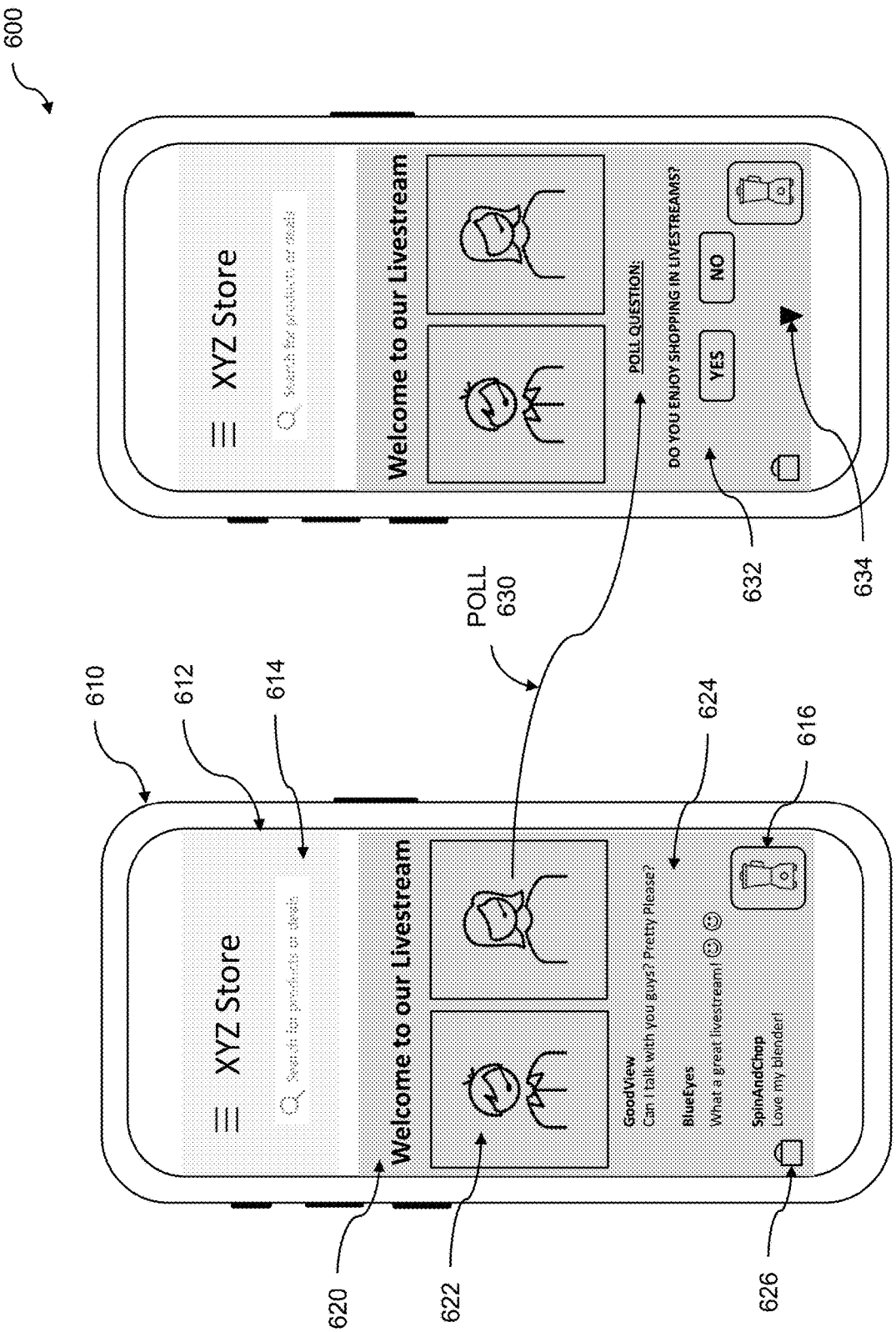
FIG. 6 is an infographic for including questions and polls in a livestream.

FIG. 6 is an infographic for including questions and polls in a livestream. During a livestream event, a host of the livestream event can choose to submit a question to the viewers, to poll the viewers for an opinion, and so on. The question or poll can be associated with the product on display within the livestream, a general survey such as gauging the joy of a viewer who is shopping online with other viewers, and so on. The poll or the question can be presented to a viewer, a subset of the plurality of viewers, all of the viewers, and so on. Depending on an answer provided by one or more viewers, further questions and polls may be initiated. The including questions and polls in a livestream enables a multi-hosted livestream in an open web ecommerce environment. A viewer can use an electronic device to view a livestream event in which questions and polls can be included. In the infographic 600, an electronic device 610, which can include any of a variety of personal electronic devices such as a computer device, a portable device, a handheld device, and so on, is used to view a livestream event. The viewer can view the livestream event within a video player window 612. The video player window can include a web browser window, a video streaming app, etc. An ecommerce site 614 can be rendered within the player window. The rendering of the ecommerce site can include an ecommerce site name, menu options, a search function, and so on. The product 616 being offered within the livestream event can also be rendered within the video player window.

The product can be rendered as a photo or reduced photo of the product, a highlighted image of the product, a representation of the item, etc.

As mentioned above, a livestream event 620 that can be rendered within the video player window can continue to play within the video player window while the viewer interacts with the ecommerce site. The livestream can include a host, a plurality of hosts, a combination of one or more hosts and one or more viewers, and the like. In the infographic, two hosts are shown 622. A rendering of the livestream event can further include viewer names, viewer questions and comments, etc. The viewer names and associated text can be obtained from sources such as social media 624, where the social media can be associated with the livestream event. The social media feeds can be observed by the one or more hosts during the livestream event. The questions and comments provided by the viewers of the livestream event can be displayed in the livestream event rendering, selected by one or more hosts, and so on. The livestream can further include a representation of a virtual purchase cart 626. Clicking on the representation of the virtual purchase cart can open the cart to see cart contents, can add products 616 to the cart, etc.

A host, such as one of the two hosts shown, can submit a poll or question to the viewers of the livestream event. A host creates and submits a poll 630 which can appear in the livestream event window. A sample poll 632 is shown which posits a simple question and seeks a "yes" or "no" response. When the viewer has made her or his decision about their answer to the poll, they can click the yes button or the no button. The viewer can then submit her or his answer by clicking 634. The clicking can include clicking a button such as a "submit" button, an icon, and the like. While a simple yes/no poll question is shown, other types of polls and questions can be submitted by one or more of the hosts to an individual viewer, a subset of the plurality of viewers, all of the viewers, etc. The poll or question can have a time limit within which a viewer can respond. If the viewer does not respond in time, then the poll or question can be removed from the livestream. In a usage example, a time limited question can include, "Do you want free shipping?" A poll or question can include a follow-up poll or question. In a usage example, a viewer can be asked whether she or he would like to receive further information, special offers, information from relevant third-party vendors, and so on. If the viewer responds positively, then a follow-up question can include a preference for text or email communication, a cell phone number or an email address, etc.

Figure 7:
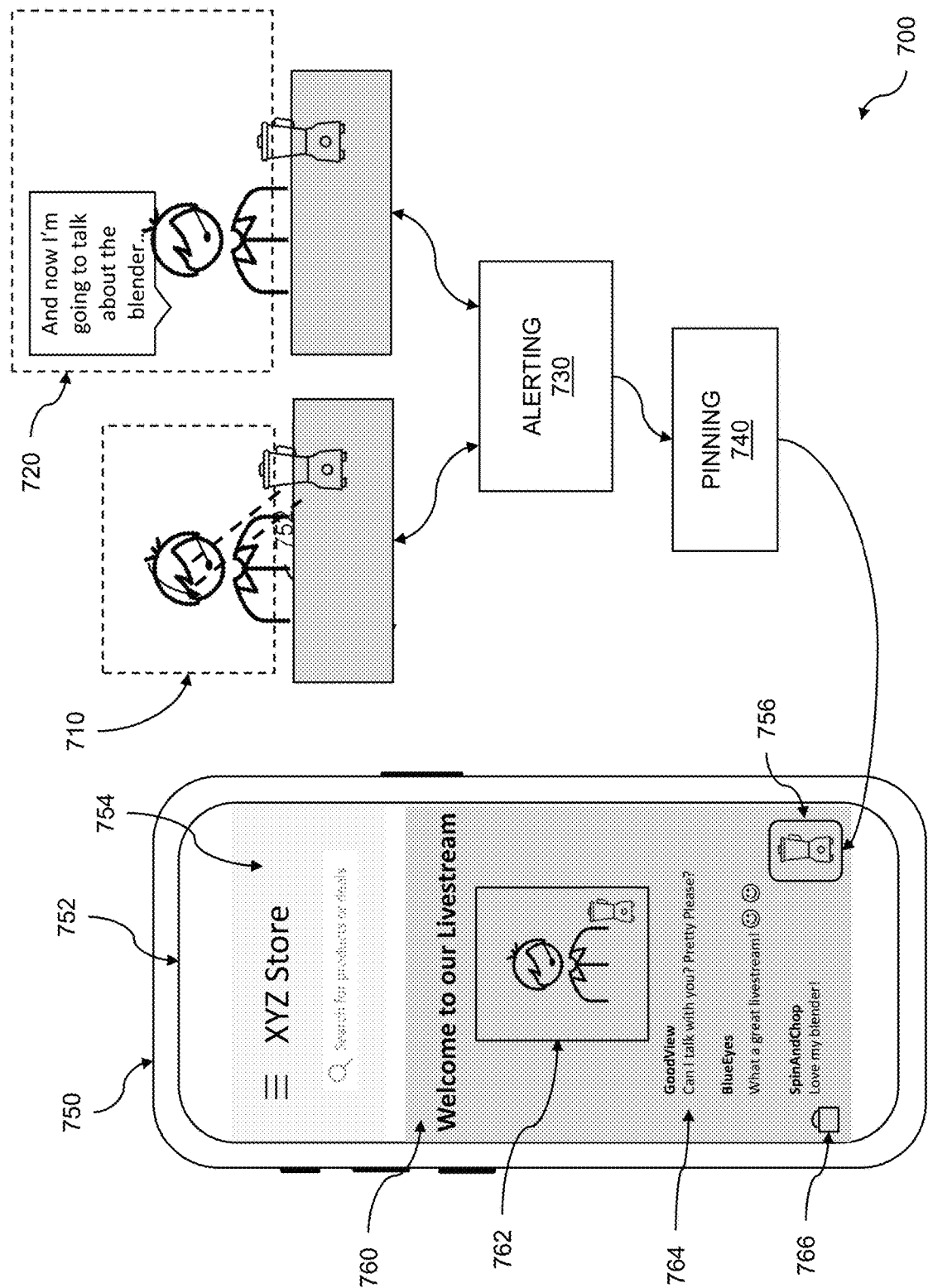
FIG. 7 shows identifying when a host highlights a product.

FIG. 7 shows identifying when a host highlights a product 700. A livestream event that is hosted by one or more hosts can be experienced by a viewer who is observing the livestream event using a video player. The video player can be executing on an electronic device such as a desktop computer, a laptop computer, a tablet device, a smartphone, and so on. The livestream can include one or more products for sale within the livestream event. The host can present, promote, endorse, etc. one or more products for sale. During the livestream event, the host can be alerted to highlight a given product. The alerting can be based on a time point within the livestream event, a prompt from a producer or director of the livestream event, and the like. Further embodiments can include identifying when one of the plurality of hosts highlights the at least one product for sale. The highlighting of a product by a host can be accomplished using a variety of techniques. The highlighting the product can be based on identifying the product within the livestream event. In embodiments, the identifying is based on machine learning. The machine learning can be used to identify which of a number of products within the livestream should be highlighted. In embodiments, the identifying can be based on gaze detection 710 of one of the plurality of hosts. The gaze detection can be determined using various techniques. In embodiments, the gaze detection is accomplished using a cylindrical coordinate system. The cylindrical coordinate system can be used to determine head position of the host, head rotation, etc., to determine whether the host is gazing in the direction of a given product. In embodiments, the gaze detection can include an angle of the first host's face or the second host's face relative to the at least one product for sale. Other techniques can be used to determine that a host is identifying a product. In embodiments, the identifying can be based on speech analysis 720. The speech analysis can be based on natural language processing (NLP), where the NLP can be used to identify keywords and phrases that can be associated with a given product.

Further embodiments include alerting 730 the plurality of hosts to pin the product card associated with the at least one product for sale. The alerting can be accomplished by sending an email message, a text message, a voice instruction, and so on. The alerting can be accomplished by signaling one or more hosts from a control booth. The email, text voice instruction, etc. can originate from a director, a producer, etc. of the livestream event. Other embodiments include pinning 740 a product card, using one or more processors, in the livestream window. The pinning can be accomplished by one or more of the plurality of hosts associated with the livestream event. The pinning can be accomplished by an action performed by the host. The action can include clicking a button, selecting a menu option, and so on. The action can include picking up or handling the product. The pinning the product card can be accomplished within a video player window associated with a viewer's device.

The product card that is pinned by one or more of the hosts associated with a livestream event can be rendered within a livestream window that can be observed by a plurality of viewers. A viewer can use an electronic device 750 to view a livestream. The electronic device, such as device 750, can include a variety of desktop, portable, and personal electronic devices. The viewer can view the livestream event within a video player window 752. The video player window can include a window opened by a video player within a web browser, a video player app, etc. An ecommerce site, such as ecommerce site 754 can be rendered within the player window. The rendering of the ecommerce site can include an ecommerce site name, a menu, a search function, and the like. The product 756 that is being offered can further be rendered within the video player window. The product can be rendered as an icon or pictogram, a photo, a highlighted image of the product, a representation of the item, and so on.

The livestream event such as livestream event 760 can continue to play within the video player window while the viewer interacts with the ecommerce site. The livestream event can be partially, substantially, or entirely obscured by the product card. The livestream can include a host 762, a plurality of hosts, a combination of one or more hosts and one or more viewers, and the like. A rendering of the livestream event can further include viewer likes and dislikes, queries, comments, and other viewer-related information. The viewer-related information can be obtained from social media and other forums. The viewer information can include viewer names, viewer information, etc. The viewer names and associated text can be obtained from feeds such as social media feeds 764 associated with the livestream event. The social media feeds can be monitored during the livestream event. The social media questions and comments can be added as gathered from the social media feed directly to the livestream event rendering. The social media content can further be selected by one or more hosts. The livestream can further include an icon, a logo such as a vendor logo, or some other representation of a virtual purchase cart 766. Clicking on the representation of the virtual purchase cart can open the cart to see cart contents, add a product 756 to the cart, etc.

Figure 8:
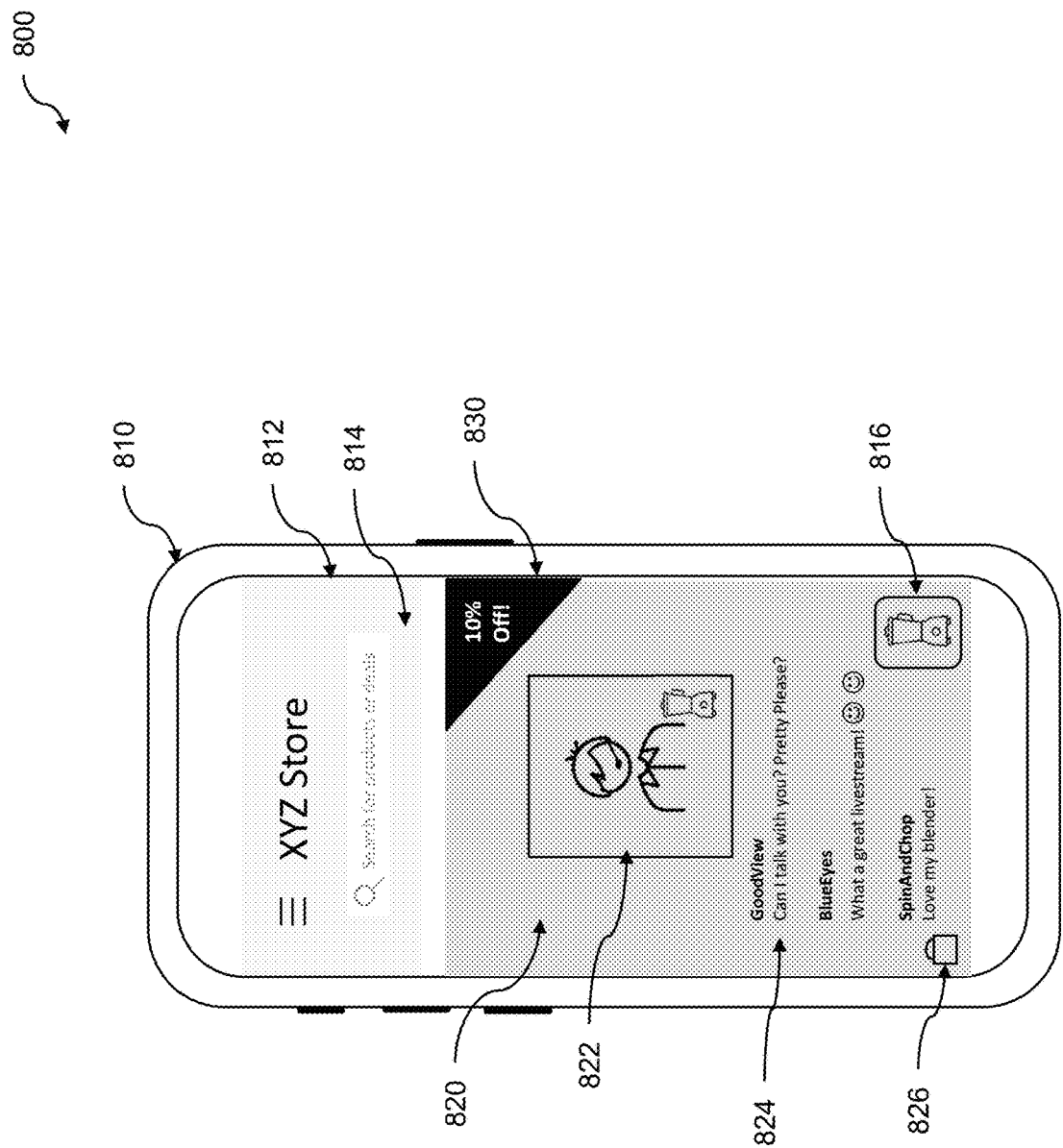
FIG. 8 illustrates presenting a coupon overlay to a viewer.

FIG. 8 illustrates presenting a coupon overlay to a viewer. Discussed previously and throughout, a product card can be pinned in the livestream window by one of the plurality of hosts 800. The product card that is pinned can represent the at least one product for sale. A viewer can use an electronic device to view a livestream event. The electronic device such as device 810 can include a computer device, a portable device, a handheld device, and so on. The viewer can view the livestream event within a video player window 812. The video player window can include a window opened by a video player associated with a web browser, a video streaming app, and the like. An ecommerce site, such as ecommerce site 814, can be rendered within the player window. The rendering of the ecommerce site can include an ecommerce site name, menu options, a search function, and so on. The product 816 that is being offered can also be rendered within the video player window. The product can be rendered as a photo, a highlighted image of the product, a representation of the item, and so on.

The livestream event such as livestream event 820 can continue to play within the video player window while the viewer interacts with the ecommerce site. The livestream can include a host 822, a plurality of hosts, a combination of one or more hosts and one or more viewers, and the like. A rendering of the livestream event can further include viewer names, viewer questions and comments, etc. The viewer names and associated text can be obtained from feeds such as social media feeds 824 associated with the livestream event. The social media feeds can be monitored during the livestream event. The social media questions and comments can be added unfiltered to the livestream event rendering, selected by one or more hosts, and so on. The livestream can further include an icon or other representation of a virtual purchase cart 826. Clicking on the representation of the virtual purchase cart can open the cart to see cart contents, can add a product 816 to the cart, etc.

At various points within the livestream event, a coupon 830 can be rendered within the video player window. The coupon can offer discounts, free product shipment, free additional products if the product is purchased, and so on. Embodiments include presenting a first coupon overlay to the viewer, wherein the presenting is rendered to the viewer. Since a plurality of viewers can observe the livestream event, coupons can be presented to one or more of the plurality of viewers. In embodiments, the presenting can include a second coupon overlay rendered to a second viewer, wherein the first coupon overlay and second coupon overlay are different. The coupon can be presented at various points within the livestream event. In embodiments, the presenting can be based on when the first host or the second host highlights the at least one product for sale. The coupon can include a time limited coupon such as "Buy within the next 5 minutes and save 10%." The coupon can include a time sensitive coupon. In a usage example, a coupon can begin by offering a discount such as a 10% discount. As time passes, the amount of the discount offered by the coupon can decrease.

Figure 9:
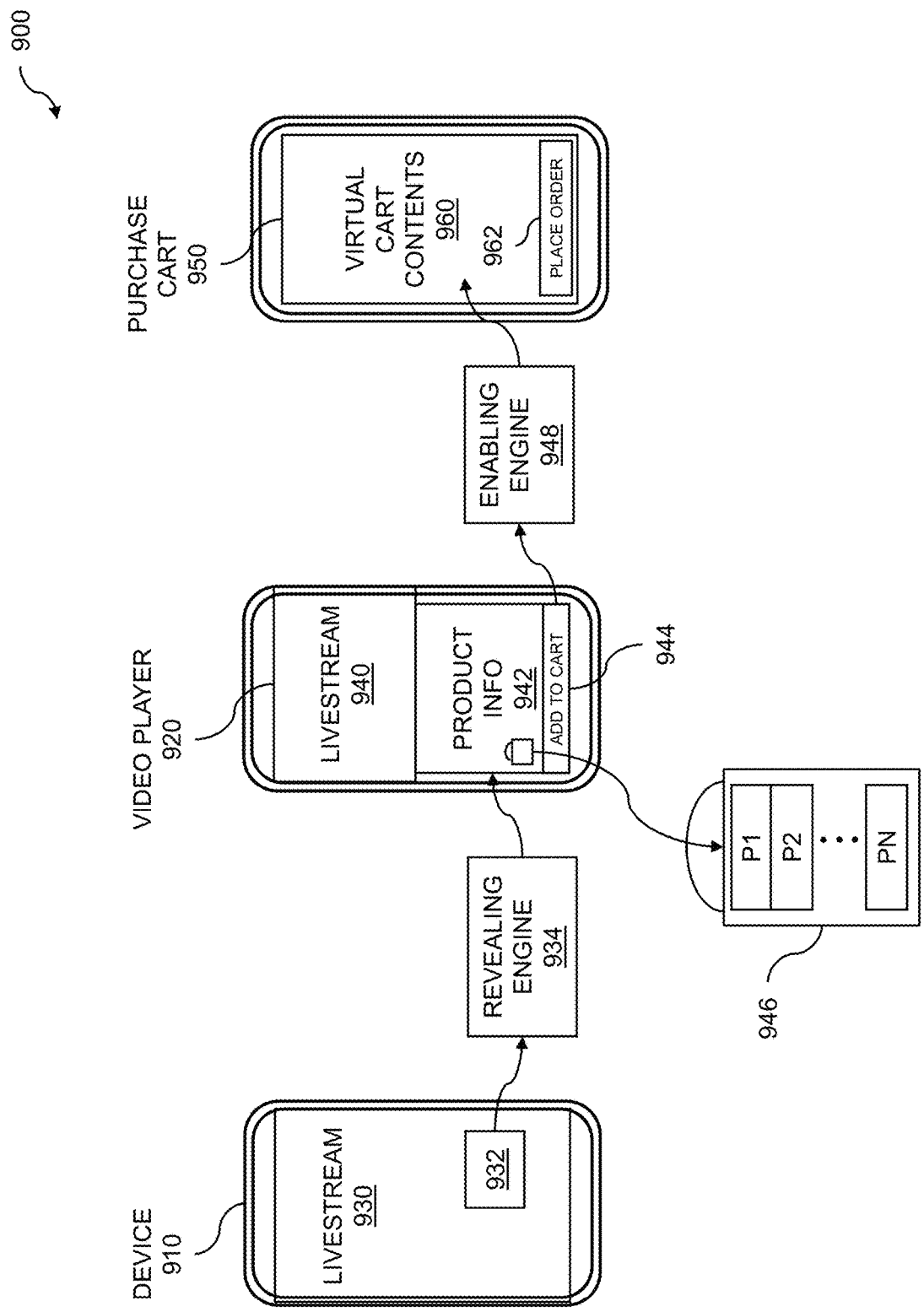
FIG. 9 is an infographic for an ecommerce checkout in a multi-host livestream.

FIG. 9 is an infographic 900 for an ecommerce checkout in a multi-host livestream. A viewer can observe a livestream event in which a product is introduced, promoted, endorsed, recommended, and so on. The livestream event can be presented by plurality of hosts, where the plurality of hosts can include visible hosts and hidden hosts. The visible hosts can be seen within the livestream. A hidden host can be promoted within the livestream, thereby becoming a visible host. If promoting a hidden host would exceed a number of hosts who can be visible at a given time within the livestream, then one of the visible hosts can be reassigned as or "demoted" to a hidden host. The viewer can choose to learn more about the product, and if interested, can add the product to a virtual purchase bag or cart in order to purchase the product. The user can examine the product, learn details about the product, purchase the product, etc., without leaving the livestream that contains the product. Instead, the livestream can continue to play while the user is learning more about the product, purchasing the product via an ecommerce checkout technique, etc. The add-to-cart operation and the ecommerce checkout can be accomplished by clicking on an icon representing a virtual purchase cart or by interacting with the product within the livestream. The interacting can include tapping, clicking, swiping, mousing over or hovering, and the like. The ecommerce purchase operation enables a multi-hosted livestream in an open web ecommerce environment. A livestream event is initiated on a website, with a plurality of viewers, wherein the initiating includes a first host. At least one product for sale is included in the livestream event with the plurality of viewers, wherein the livestream event is displayed in a livestream window. A second host is added to the livestream event, wherein the adding causes the first host and second host to appear simultaneously in the livestream event and wherein the first host and the second host comprise a plurality of hosts. A product card is pinned, using one or more processors, in the livestream window by one of the plurality of hosts, wherein the product card represents the at least one product for sale. Purchase details of the at least one product for sale are revealed, based on a first action with the product card by a viewer, wherein the revealing is rendered to the viewer. An ecommerce purchase is enabled for the at least one product for sale by the viewer, wherein the ecommerce purchase is accomplished within the livestream window.

A device 910 can be used to display a livestream event 930. The device can include any of a variety of electronic devices such as a hand-held electronic device, a portable electronic device, a desktop electronic device, and so on. The livestream event 930 can comprise a short-form video. In addition to the short-form video, a product card 932 can be rendered within the livestream. The product can include a cosmetic or haircare product; clothing; jewelry; household items such as furniture, window treatments, or bedding; tools; a service; a cruise or vacation package; and the like. The product card 932 that is rendered can be determined by one or more products that were highlighted based on actions of a host individual within the livestream event 930, and/or other criteria. The host actions can include handling the product, talking about the product, gazing at the product, etc. In embodiments, the host interactions can be identified based on machine learning (ML) techniques. The product card can be rendered based on viewer actions. The viewer actions can include clicking on, tapping, mousing over, etc. the product with the livestream. The viewer actions can further be determined based on metadata. In embodiments, the metadata can include hashtags, repost velocity, participant attributes, participant history, ranking, product purchase history, view history, or participant actions.

A variety of information types and content can be provided to the viewers of the livestream event 940 using a video player 920. The video player can be associated with a web browser, a web access application, a video streaming app, etc. loaded on an electronic device associated with a viewer. The app can include a livestream viewing app. A revealing engine 934 can reveal purchase details of the at least one product for sale, based on a first action with the product card by a viewer. The revealing is rendered for the viewer in the viewer's device. When a viewer interacts with the product card, the revealing engine can reveal product details and information to the viewer. When the user selects (e.g., by tapping, clicking, mousing over, etc.) the product card 932, product information 942 can be rendered. The product information can be overlaid on the livestream event which continues to play in the video player on the device. The product cart 942 can be expanded to include a checkout control such as an "Add to Cart" button 944. Clicking or otherwise selecting the add-to-cart button can add the product to the viewer's virtual purchase cart 946. The product information can further include a virtual purchase cart icon. More than one product can be present in the virtual purchase cart. The one or more products can be added throughout the livestream event, as products are shown or highlighted, as the viewer decides to add the products, etc. The virtual purchase cart can include one or more products such as product P1, product P2, product PN and so on.

Invoking the checkout control such as the add-to-cart button can be detected by an enabling engine 948. The enabling engine can enable an ecommerce purchase of the at least one product for sale by the viewer. The ecommerce purchase is accomplished within the livestream window. The ecommerce purchase can be accomplished through an ecommerce site associated with the one or more hosts, sponsors or producers of the livestream events, third-party ecommerce sites associated with the products being sold, and so on. The ecommerce engine can cause the device 910 to render a purchase cart 950 on the device, which can display virtual cart contents 960. Virtual cart contents 960 can further include a purchase control 962. The purchase control can include a button such as a "Place Order" button 962, a menu or option selection, and so on. Invoking the purchase control 962 can cause the electronic device 910 to enable an ecommerce purchase of the items corresponding to entries (P1-PN) in the virtual purchase cart.

Figure 10:
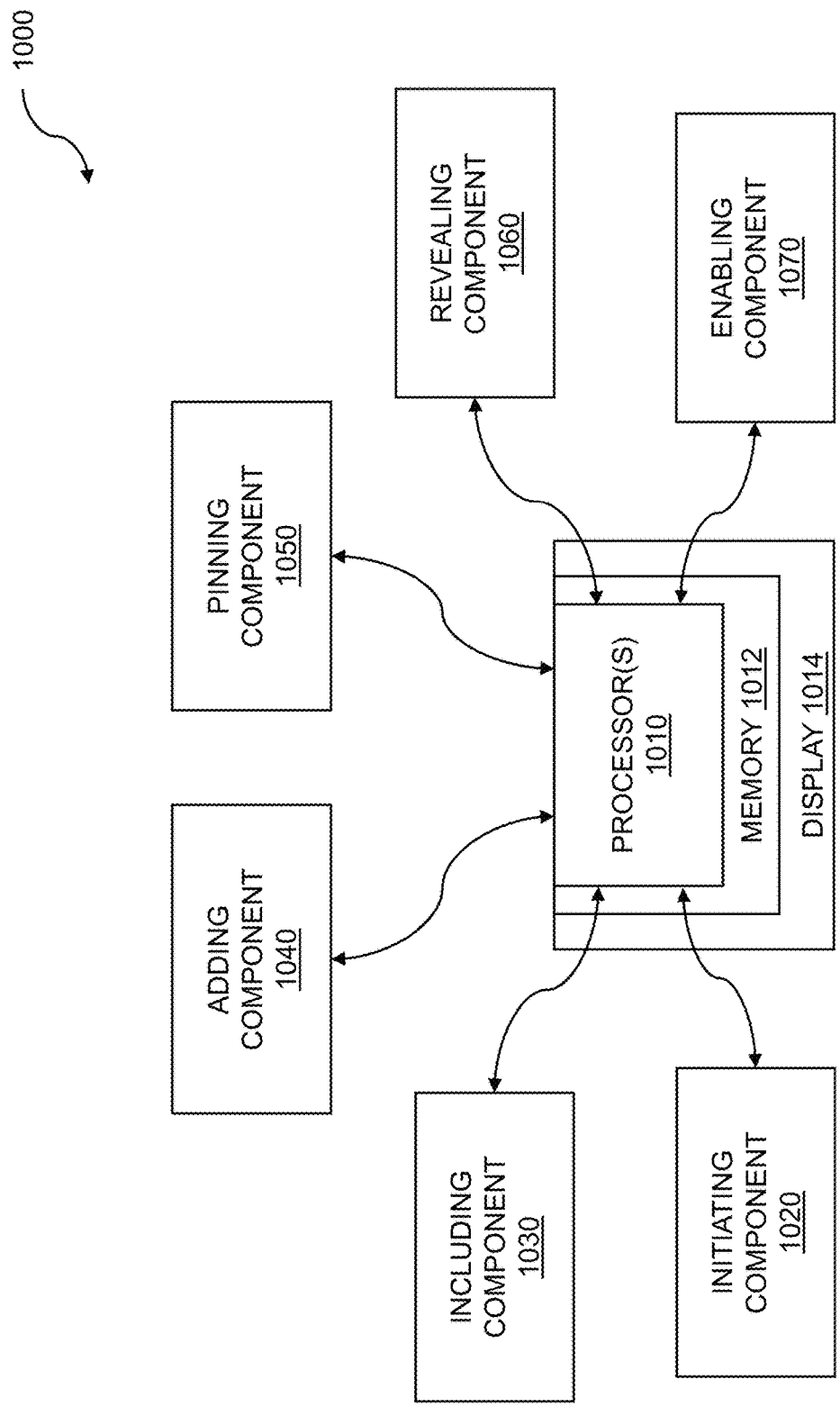
FIG. 10 is a system diagram for a multi-hosted livestream in an open web ecommerce environment.

FIG. 10 is a system diagram for a multi-hosted livestream in an open web ecommerce environment. The system 1000 can include one or more processors 1010 attached to a memory 1012 which stores instructions. The system 1000 can include a display 1014 coupled to the one or more processors 1010 for displaying data, video streams, videos, highlighted products, product information, product cards, virtual purchase cart contents, webpages, intermediate steps, instructions, and so on. In embodiments, one or more processors 1010 are coupled to the memory 1012 where the one or more processors, when executing the instructions which are stored, are configured to: initiate a livestream event, on a website, with a plurality of viewers, wherein the initiating includes a first host; include at least one product for sale in the livestream event with the plurality of viewers, wherein the livestream event is displayed in a livestream window; add a second host to the livestream event, wherein the adding causes the first host and second host to appear simultaneously in the livestream event and wherein the first host and the second host comprise a plurality of hosts; pin a product card, using one or more processors, in the livestream window by one of the plurality of hosts, representing the at least one product for sale; reveal purchase details of the at least one product for sale, based on a first action with the product card by a viewer from the plurality of viewers, wherein the revealing is rendered to the viewer; and enable an ecommerce purchase of the at least one product for sale by the viewer, wherein the ecommerce purchase is accomplished within the livestream window.

The system 1000 can include an initiating component 1020. The initiating component 1020 can include functions and instructions for initiating a livestream event on a website, with a plurality of viewers, wherein the initiating includes a first host. The livestream event can include a substantially contemporaneous livestream event. In embodiments, the livestream event can be a livestream replay. The initiating can include providing a uniform resource locator (URL) link to the website on which the livestream video can be viewed. The livestream can include a playback session on the website, where the playback session can be based on HLS (HTTP Live Streaming), MPEG-DASH (Dynamic Adaptive Streaming over HTTP), WebRTC, RTSP (Real-Time Streaming Protocol), and/or other suitable protocols. The viewers can include members of a social media service, subscribers to a channel such as a celebrity channel provided through a service such as a video service, etc. The first host can include a representative of a provider of goods or services, a paid presenter, a celebrity, an influencer, and the like. In embodiments, the livestream event can be rendered on the website or an application running on a device. The website can be viewed through a web browser on an electronic device such as a desktop or laptop computer, a tablet, a smartphone, etc. The application or app can be downloaded from an app site such as the Apple™ App Store™ Google™ Play™, and the like. In embodiments, the initiating can be accomplished with embedded codes. The embedded codes can detect when a potential viewer has followed a URL to a website that can host the livestream, has moved a cursor over a window within the webpage, and so on. The initiating can further be accomplished by clicking a web link, a button on the webpage, etc. In embodiments, the initiating can further include at least one poll or question. The poll can be used to survey potential viewers about products or services in which they may be interested, their levels of interest in a set of products for sale, and the like. The question can include a query about a specific type of product, such as, "Are you interested in deals on shoes today?"

The system 1000 can include an including component 1030. The including component 1030 can include functions and instructions for including at least one product for sale in the livestream event with the plurality of viewers, wherein the livestream event is displayed in a livestream window. The at least one product for sale can include a household item, a cosmetic or haircare product, a tool or toolset, an electronic device, a cruise or a ski trip, a service, and so on. The at least one product can be held by the host, on a surface near the host, within line of sight of the host, and the like. In embodiments, the at least one product for sale can be a service or event. The system 1000 can include an adding component 1040. The adding component 1040 can include functions and instructions for adding a second host to the livestream event, wherein the adding causes the first host and second host to appear simultaneously in the livestream event and wherein the first host and the second host comprise a plurality of hosts. The second host can be associated with the first host. The second host can be a work colleague, a celebrity, a paid endorser, an influencer, and the like. In embodiments, the second host can be added to the livestream by a web link. The first host can click on the web link to add the second host. The clicking on the web link can result from the first host deciding to add the second host, a scripted point of time associated with production of the livestream, etc. In embodiments, the second host can be added to the livestream by an application running on a device. The second host can be added to the livestream by opening a window within the livestream. In a usage example, the first host clicks on the web link in order to admit the second host to the livestream. A window showing the first host can remain open within the stream, while a second window can also be opened within the livestream to show the second host. The first host and the second host can appear side by side, one above the other, etc.

The first host and the second host can comprise a plurality of hosts. The plurality of hosts can include more than two hosts. Since the livestream window can be small, such as a livestream window rendered on a handheld device, a subset of hosts can be rendered within the video stream at a given time. In embodiments the plurality of hosts can include visible hosts and hidden hosts. In a usage example, a livestream event can be hosted by five hosts. Since the livestream window as rendered on a viewer's handheld device can be small, then a subset of the five hosts can be shown. In the usage example, host one and host three can be shown, while hosts two, four, five can remain hidden hosts. During the livestream event, a viewer may be selected from the plurality of viewers. The viewer can be selected to be interviewed, to share an opinion about a product for sale, and the like. Further embodiments include promoting at least one viewer, from the plurality of viewers, to appear in the livestream event. The promoted viewer can interact with the one or more hosts. Further embodiments include limiting a combined number of visible hosts and promoted viewers to a predetermined number, wherein one or more visible hosts are demoted to hidden hosts. The predetermined number can be set by the host or hosts, fixed within the livestream, set as a preference by a viewer, etc. In embodiments, the promoting the at least one viewer can be accomplished by one of the visible hosts. The visible host who promotes the viewer can do so based on a comment, a reaction, etc., associated with the viewer. In embodiments, the promoting can be executed in response to a request of the at least one viewer during the livestream. The request can include a request for more information, a request to speak, etc. A combination of up to 16 hidden hosts and promoted viewers can be stored in a queue, wherein the number of visible hosts and promoted viewers exceeds the predetermined number.

The system 1000 can include a pinning component 1050. The pinning component 1050 can include functions and instructions for pinning a product card, using one or more processors, in the livestream window by one of the plurality of hosts, wherein the pin represents the at least one product for sale. A product card can include a specific page such as a webpage that can include detailed information associated with the at least one product for sale. The product card can be rendered within the livestream. The product card can include information such as product size options, weight, color options, dimensions, configurations, quantity available, giftwrapping options, available gift cards, and so on. In embodiments, the product card can include text, a picture, a line drawing, an icon, or an emoji. The product card can be pinned by a host associated with the livestream event. In embodiments, the hidden hosts are prevented from the pinning a product card. The product card can be rendered within the livestream, can be depicted by an icon or a highlighted product, a representation of the product, and the like. If the product card is not rendered in part or in full, then a viewer can click on the icon, highlighted product, etc. to view the product card.

Further embodiments include identifying when one of the plurality of hosts highlights the at least one product for sale. A host can be adjacent to the product for sale, handling the product, directing attention to the product, and so on. The identifying can be determined using a variety of techniques. In embodiments, the identifying can be based on machine learning (ML). The machine learning can be used to analyze host actions, gestures, behavior, and so on within the video stream. In embodiments, the identifying can be based on speech analysis. The speech analysis can be based on natural language processing, where the natural language processing can search for speech keywords, phrases, etc. that can be associated with a product for sale. In other embodiments, the identifying can be based on gaze detection for gaze of one of the plurality of hosts. Highlighting the at least one product for sale can be accomplished by a host gazing at the product within the livestream event. In embodiments, the gaze detection can be accomplished using a cylindrical coordinate system. A cylindrical coordinate system can be based on a distance r, an angle θ, and a height z. In embodiments, the gaze detection can include an angle of the first host's face or the second host's face relative to the at least one product for sale. That is, if the first host or the second host is looking at the product within the livestream, then the product can be highlighted. Further embodiments can include alerting the plurality of hosts to pin the product card associated with the at least one product for sale. The alerting can be based on a scripted time, on a request from one or more viewers of the livestream event, etc.

The highlighting the at least one product within the livestream event can include rendering a highlight indication as an overlay overtop the product. The highlight indication can include a closed shape such as a rectangle, oval, or other shape. In embodiments, the coordinates of a bounding box or other highlighting technique for an object within a video can be obtained. This obtaining of coordinates can be accomplished utilizing a computer vision library such as OpenCV, or the like. The coordinates of the bounding box can be used as input to a drawing function that draws the bounding box at the proper location within a viewport that is displaying the livestream. If a host individual picks up an object or otherwise moves it, updated coordinates can be obtained from the computer vision library, and a new highlight indication can be rendered in the updated location while any previous highlight indications are erased. In this way, the highlighted object remains highlighted, even as the object is moved. The highlighting can include a variety of shapes and colors, as well as other visual effects such as blinking, color shifting, overlay of animated graphics, and/or display of icons.

The system 1000 can include a revealing component 1060. The revealing component 1060 can include functions and instructions for revealing purchase details of the at least one product for sale, based on a first action with the product card by a viewer, wherein the revealing is rendered to the viewer. The revealing can include revealing coupons, virtual purchase carts, and/or other information related to the highlighted product. The coupons can include QR codes, barcodes, alphanumeric codes, and the like. The virtual purchase carts can enable ecommerce purchase of one or more products that are shown and/or mentioned in the livestream event. The purchase details can include a link to an ecommerce site, an "Add to Cart" button, a representation of a digital shopping bag or shopping cart, and so on. The purchase details can include size or color selections, a desired quantity, etc. A first action can include clicking on the product card, tapping the card, moving a cursor on the card, and so on. In embodiments, the viewer to whom the purchase details are revealed can be from the plurality of viewers. The revealing component can reveal purchase details to more than one viewer. In addition to revealing purchase details, other offers, incentives, and so on can be presented to the viewer. Further embodiments can include presenting a first coupon overlay to the viewer, wherein the presenting is rendered to the viewer. The coupon can include a discount, a time-based discount such as, "Buy within the next 5 minutes", a count-down coupon where the amount of a discount decreases over time, a "buy one get one" (i.e., BOGO) coupon, etc. In other embodiments, the presenting can include a second coupon overlay rendered to a second viewer, wherein the first coupon overlay and the second coupon overlay are different. Differences between the first coupon overlay and the second coupon overlay can include different discount amounts, time frames for discount, incentives, and the like. The coupon overlay differences can be based on a level of viewer interaction, past purchase history, membership level, etc.

Further differences between coupon overlays offered to various viewers of the livestream event can be included. In embodiments, the presenting of a coupon overlay can be based on when the first host or the second host highlights the at least one product for sale. The coupon overlay can be based on a time point with the livestream event, a product reveal executed by the host, etc. The coupon overlay can be based on a number of products available, number remaining, closeouts, holiday specials, "Black Friday" offerings, "Cyber Monday" events, and so on. In other embodiments, the presenting can be based on the viewer watching the livestream for a period of time. The viewer can be "rewarded" for watching for a period of time, enticed to "convert" (purchase) the item, and the like. In embodiments, the presenting can be based on the pinning of the product card. That is, the coupon, special offer, incentive, etc., is unknown to the one or more viewers until the product card is pinned. Other criteria for presenting a coupon overlay can be based on the familiarity, popularity, and so on of a host. In embodiments, the presenting can be based on the first host or the second host being a celebrity. The first host or the second host can further include a media star, a social media influencer, etc. In other embodiments, the presenting can be based on analyzing the viewer's interaction with the livestream. In a usage example, a viewer can like a product, share it with friends, share the product on the viewer's social media feeds, and so on. The viewer can further interact by posting questions about the product on the livestream event, posting comments, etc. In embodiments, the analyzing can be based on metadata. The metadata can be based on actions, activities, etc., performed by the viewer during the livestream event. In embodiments, the metadata can include hashtags, repost velocity, participant attributes, participant history, ranking, product purchase history, view history, or participant actions.

The system 1000 can include an enabling component 1070. The enabling component 1070 can include functions and instructions for enabling an ecommerce purchase of the at least one product for sale by the viewer, wherein the ecommerce purchase is accomplished within the livestream window. One or more of the plurality of viewers of the livestream event can purchase a product, a service, etc. being promoted by the one or more hosts of the livestream event. A viewer can purchase the product without having to "leave" the livestream event. Leaving the livestream event can include having to disconnect from the event, open an ecommerce window separate from the livestream event, and so on. The livestream event can continue while the viewer is engaged with the ecommerce purchase. In embodiments, the livestream event can continue "behind" the ecommerce purchase window, where the virtual purchase window can obscure or partially obscure the livestream event. In embodiments, the enabling can include a virtual purchase cart, wherein the virtual purchase cart is rendered to the viewer. The virtual purchase cart can be presented as a GIF, an icon, a pictogram, an emoji, and so on. The virtual purchase cart can be represented by a cart, a basket, a bag, a tote, etc. In embodiments, the livestream event can display the virtual purchase cart to the viewer during the livestream based on a second action by the viewer. The second action can include making a product selection, choosing a product color or size, selecting a product quantity, etc. In embodiments, the virtual purchase cart rendered to the viewer covers a portion of the livestream window. The virtual purchase cart can be expanded so that the viewer can observe the contents of the cart, can be reduced in size or minimized, and so on.

These components of system 1000 combine to enable enhanced interaction with livestream events such as ecommerce livestream events. The system 1000 can perform functions such as livestream event product setup. This can include crawling product catalogs to ingest images and associated descriptions, and training machine learning systems using the product catalog data. The product detection and training can be curated. Additionally, internet search engines can be used to search for additional related images. Embodiments can further include performing augmentation to enhance product angles. The augmentation can include various image transformations, including, but not limited to, shifts, flips, zooms, and more. The augmentation can further include lighting augmentation such as contrast and/or brightness adjustments. The augmentation can serve to expand the training data to enable more effective output from machine learning systems. The system 1000 can further include the feature of performing text label extraction. This enables more accurate identification of products that include text labeling, images, barcodes, and/or other identifiers on packaging and/or labeling.

During a livestream event, the system 1000 can perform livestream video frame sampling. For one or more frames, a face angle model can be applied to determine if a host individual is facing toward a product for a predetermined time interval. Additionally, a gaze model can be applied to the frames to determine if the host individual is actually looking toward the product. The face angle and gaze models can be used to derive an estimated center of focus. Within the estimated center of focus, a focal point can be identified. Products that overlap in space with the focal point and/or center of focus can be selected as a highlightable product. Based on this information, along with identifying of product labels and product coordinates, objects of interest within the frame are detected and categorized. Metadata corresponding to the objects of interest can be embedded as metadata into the video stream frame. This facilitates enhanced customer experience during livestream replays since the relevant metadata is already present within the livestream replay. When the metadata is encountered during a livestream replay, it can be used to trigger a real-time product highlight API, which can then initiate rendering of a highlight indication. In addition to the rendered highlight indication, an audio effect such as a chime sound can be mixed into the audio track of the short-form video. Thus, in embodiments, a sound effect is output concurrently with the rendering of the highlight indication. Additionally, an audio analysis model can be run on an audio track of the livestream broadcast to perform speech recognition and natural language processing and to determine when a given product is being discussed.

The system 1000 can also receive input from viewers of ecommerce livestream events, including a region selection. The region selection includes coordinates that specify a portion of a video frame. The contents of the video frame within the region can be analyzed using the machine learning systems. Objects within the region selection can be identified and product information for the corresponding objects can be retrieved and presented in the form of product cards, coupons, and the like. This gives the unique advantage of promoting additional products that may not actually be the subject of the short-form video. As an example, if a host individual is wearing a nice shirt that generates interest from viewers, disclosed embodiments enable viewers of the short-form video to easily obtain more information about the shirt, and even purchase the shirt if desired. This can occur even if the host individual is demonstrating/discussing some other product unrelated to his/her shirt. In this way, previously untapped product promotion opportunities are realized, by virtue of the enhanced video analysis of disclosed embodiments.

The system 1000 can include computer program product embodied in a non-transitory computer readable medium for video processing, the computer program product comprising code which causes one or more processors to perform operations of: initiating a livestream event, on a website, with a plurality of viewers, wherein the initiating includes a first host; including at least one product for sale in the livestream event with the plurality of viewers, wherein the livestream event is displayed in a livestream window; adding a second host to the livestream event, wherein the adding causes the first host and second host to appear simultaneously in the livestream event and wherein the first host and the second host comprise a plurality of hosts; pinning a product card, using one or more processors, in the livestream window by one of the plurality of hosts, representing the at least one product for sale; revealing purchase details of the at least one product for sale, based on a first action with the product card by a viewer from the plurality of viewers, wherein the revealing is rendered to the viewer; and enabling an ecommerce purchase of the at least one product for sale by the viewer, wherein the ecommerce purchase is accomplished within the livestream window.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for video processing comprising:
   initiating a livestream event, on a website, with a plurality of viewers, wherein the initiating includes a first host;
   including at least one product for sale in the livestream event with the plurality of viewers wherein the livestream event is displayed in a livestream window;
   adding a second host to the livestream event, wherein the adding causes the first host and second host to appear simultaneously in the livestream event and wherein the first host and the second host comprise a plurality of hosts wherein the plurality of hosts includes visible hosts and at least one hidden host;
   pinning a product card, using one or more processors, in the livestream window by one of the plurality of hosts, wherein the card represents the at least one product for sale;
   revealing purchase details of the at least one product for sale, based on a first action with the product card by a viewer from the plurality of viewers, wherein the revealing is rendered to the viewer;
   and
   enabling an ecommerce purchase of the at least one product for sale by the viewer, wherein the ecommerce purchase is accomplished within the livestream window.

2. The method of claim 1 further comprising promoting at least one viewer, from the plurality of viewers, to appear in the livestream event.

3. The method of claim 2 further comprising limiting a combined number of visible hosts and promoted viewers to a predetermined number, wherein one or more visible hosts are demoted to hidden hosts.

4. The method of claim 3 wherein the hidden hosts are prevented from the pinning a product card.

5. The method of claim 2 wherein the promoting the at least one viewer is accomplished by one of the visible hosts.

6. The method of claim 1 wherein the second host is added to the livestream by a web link or an application running on a device.

7. The method of claim 1 further comprising adding a third host to the livestream event and including the third host in the plurality of hosts.

8. The method of claim 1 further comprising reflowing a rendering of the livestream event based on a number of hosts and viewers appearing in the livestream event.

9. The method of claim 8 wherein the livestream event is rendered in a playlist.

10. The method of claim 1 further comprising identifying when one of the plurality of hosts highlights the at least one product for sale.

11. The method of claim 10 wherein the identifying is based on speech analysis.

12. The method of claim 10 wherein the identifying is based on gaze detection of one of the plurality of hosts.

13. The method of claim 12 wherein the gaze detection includes an angle of a face for the first host or a face for the second host relative to the at least one product for sale.

14. The method of claim 10 further comprising alerting the plurality of hosts to pin the product card associated with the at least one product for sale.

15. The method of claim 1 further comprising presenting a first coupon overlay to the viewer, wherein the presenting is rendered to the viewer.

16. The method of claim 15 wherein the presenting includes a second coupon overlay rendered to a second viewer, wherein the first coupon overlay and second coupon overlay are different.

17. The method of claim 15 wherein the presenting is based on when the first host or the second host highlights the at least one product for sale.

18. The method of claim 15 wherein the presenting is based on the viewer watching the livestream for a period of time.

19. The method of claim 15 wherein the presenting is based on the pinning of the product card.

20. The method of claim 15 wherein the presenting is based on the first host or the second host being a celebrity.

21. The method of claim 15 wherein the presenting is based on analyzing an interaction of the viewer with the livestream.

22. The method of claim 1 wherein the enabling includes a virtual purchase cart, wherein the virtual purchase cart is rendered to the viewer.

23. The method of claim 22 wherein the virtual purchase cart rendered to the viewer covers a portion of the livestream window.

24. A computer program product embodied in a non-transitory computer readable medium for video processing, the computer program product comprising code which causes one or more processors to perform operations of:

initiating a livestream event, on a website, with a plurality of viewers, wherein the initiating includes a first host;

including at least one product for sale in the livestream event with the plurality of viewers wherein the livestream event is displayed in a livestream window;

adding a second host to the livestream event, wherein the adding causes the first host and second host to appear simultaneously in the livestream event and wherein the first host and the second host comprise a plurality of hosts wherein the plurality of hosts includes visible hosts and at least one hidden host;

pinning a product card, using one or more processors, in the livestream window by one of the plurality of hosts, wherein the card represents the at least one product for sale;

revealing purchase details of the at least one product for sale, based on a first action with the product card by a viewer from the plurality of viewers, wherein the revealing is rendered to the viewer;

and enabling an ecommerce purchase of the at least one product for sale by the viewer, wherein the ecommerce purchase is accomplished within the livestream window.

25. A computer system for video processing comprising:

a memory which stores instructions;

one or more processors coupled to the memory wherein the one or more processors, when executing the instructions which are stored, are configured to:

initiate a livestream event, on a website, with a plurality of viewers, wherein initiation includes a first host;

include at least one product for sale in the livestream event with the plurality of viewers wherein the livestream event is displayed in a livestream window;

add a second host to the livestream event, wherein adding causes the first host and second host to appear simultaneously in the livestream event and wherein the first host and the second host comprise a plurality of hosts wherein the plurality of hosts includes visible hosts and at least one hidden host;

pin a product card, using one or more processors, in the livestream window by one of the plurality of hosts, wherein the card represents the at least one product for sale;

reveal purchase details of the at least one product for sale, based on a first action with the product card by a viewer from the plurality of viewers, wherein the revealing is rendered to the viewer;

and enable an ecommerce purchase of the at least one product for sale by the viewer, wherein the ecommerce purchase is accomplished within the livestream window.

* * * * *